(12) United States Patent
Kikuchi et al.

(10) Patent No.: US 12,417,050 B2
(45) Date of Patent: Sep. 16, 2025

(54) COMPUTER SYSTEM AND STORAGE CONTROL METHOD

(71) Applicant: Hitachi, Ltd., Tokyo (JP)

(72) Inventors: Takafumi Kikuchi, Tokyo (JP);
Katsuto Sato, Tokyo (JP); Takahiro Yamamoto, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 93 days.

(21) Appl. No.: 18/464,405

(22) Filed: Sep. 11, 2023

(65) Prior Publication Data

US 2024/0377985 A1     Nov. 14, 2024

(30) Foreign Application Priority Data

May 11, 2023  (JP) ................. 2023-078726

(51) Int. Cl.
*G06F 11/00* (2006.01)
*G06F 3/06* (2006.01)

(52) U.S. Cl.
CPC ............ *G06F 3/0658* (2013.01); *G06F 3/067* (2013.01); *G06F 3/0604* (2013.01)

(58) Field of Classification Search
CPC .... G06F 11/1423; G06F 11/142; G06F 11/20; G06F 11/201; G06F 11/2033; G06F 11/2089
See application file for complete search history.

(56) References Cited

U.S. PATENT DOCUMENTS

| | | | |
|---|---|---|---|
| 2012/0066541 A1* | 3/2012 | Dournov | G06F 11/0709 714/E11.071 |
| 2014/0185429 A1* | 7/2014 | Takase | H04L 45/22 370/225 |
| 2015/0319034 A1* | 11/2015 | Zourzouvillys | H04M 7/00 370/228 |
| 2016/0105390 A1* | 4/2016 | Bernstein | G06F 9/526 709/220 |
| 2016/0188427 A1* | 6/2016 | Chandrashekar | H04L 67/1034 714/4.11 |
| 2016/0371136 A1 | 12/2016 | Sato | |
| 2017/0078380 A1* | 3/2017 | Aggarwal | H04L 67/02 |
| 2017/0257806 A1* | 9/2017 | Laganier | H04W 76/22 |
| 2017/0364426 A1* | 12/2017 | Blea | G06F 11/2048 |

(Continued)

FOREIGN PATENT DOCUMENTS

| | | |
|---|---|---|
| JP | 2018-536229 A | 12/2018 |
| JP | 2022-122993 A | 8/2022 |

(Continued)

*Primary Examiner* — Philip Guyton
(74) *Attorney, Agent, or Firm* — Procopio, Cory, Hargreaves & Savitch LLP

(57) ABSTRACT

In a computer system, storage controllers disposed in different data centers form a pair via a communication path between the data centers. When a communication failure occurs in the communication path between the paired storage controllers, a tie breaker takes over the data input/output from one of the storage controllers forming the pair to the other storage controller based on the statistical information of the communication characteristics of the storage controller generated by the I/O monitor, and determines failure control to stop the storage node having the one storage controller, and the storage cluster controller executes the failure control.

10 Claims, 32 Drawing Sheets

(56) References Cited

U.S. PATENT DOCUMENTS

| | | | | |
|---|---|---|---|---|
| 2018/0024964 A1* | 1/2018 | Mao | ............... | H04L 67/1097 |
| | | | | 711/173 |
| 2018/0150520 A1* | 5/2018 | Koetter | ............... | G06F 11/3409 |
| 2019/0243703 A1* | 8/2019 | Rooney | ............... | G06F 11/2056 |
| 2022/0164265 A1* | 5/2022 | Krishnan | ............ | G06F 11/2076 |
| 2023/0008978 A1* | 1/2023 | Puvvada | ............. | G06F 11/2097 |

FOREIGN PATENT DOCUMENTS

| | | |
|---|---|---|
| WO | 2015/198449 A1 | 12/2015 |
| WO | 2017/075375 A1 | 5/2017 |
| WO | 2018/164782 A1 | 9/2018 |

\* cited by examiner

| Data Center ID (2121) | Storage Node ID (2122) | Storage Controller ID (2123) |
|---|---|---|
| DC001 | SN001 | SC001 |
| DC001 | SN001 | SC003 |
| ... | ... | ... |
| DC002 | SN002 | SC002 |
| DC002 | SN002 | SC004 |
| ... | ... | ... |

| Controller Pair ID (2131) | Active Storage Controller ID (2132) | Standby Storage Controller ID (2133) |
|---|---|---|
| CP001 | SC001 | SC002 |
| CP002 | SC004 | SC003 |
| ... | ... | ... |

| Data Center ID1 | Compute Node ID |
|---|---|
| DC001 | CN001 |
| .... | ... |
| DC002 | CN002 |
| ... | ... |

Table 412:

| Data Center ID (4121) | Storage Controller ID (4122) | Volume ID (4123) |
|---|---|---|
| DC001 | SC001 | V001 |
| DC001 | SC003 | V003 |
| ... | ... | ... |
| DC002 | SC002 | V002 |
| DC002 | SC004 | V004 |
| ... | ... | ... |

FIG. 24

Table 413:

| Volume Pair ID (4131) | Volume ID (4132) |
|---|---|
| VP001 | V001 |
| VP001 | V002 |
| VP002 | V003 |
| VP002 | V004 |
| ... | ... | ured across a
COMPUTER SYSTEM AND STORAGE CONTROL METHOD

CROSS-REFERENCE TO RELATED APPLICATIONS

This application is based on and claims priority under 35 USC § 119 from Japanese Patent Application No. 2023-078726 filed on May 11, 2023, the contents of which are incorporated herein by reference.

BACKGROUND OF THE INVENTION

1. Field of the Invention

The present invention relates to a computer system and a storage control method, and is suitably applied to a computer system including a storage system constructed across a plurality of data centers, and a storage control method thereof.

2. Description of the Related Art

Conventionally, in a cloud computing environment, a system is constructed across a plurality of data centers so that IT service can be continued even when a failure occurs in units of data centers. Therefore, in a storage system operating on a cloud, a storage system is constructed across a plurality of data centers, and a configuration having resistance to a data center failure is adopted.

Here, in a storage system constructed by distributing a plurality of storages, when a communication failure occurs between a storage node or a storage cluster constituting the storage system, an entity that has detected the failure cannot distinguish whether the communication failure has occurred or a failure has occurred in a communication partner, and there is a possibility that appropriate failure control (block, failover, or the like) cannot be performed. As a method for solving such a problem, it is possible to perform control by discriminating the fault classification through an intermediary which is a third party.

For example, in a case where a communication failure occurs between storage nodes, it is possible to determine whether to perform failure control by sharing state information between the storage nodes using an intermediary as described in JP 2018-536229 T.

For example, in a case where a communication failure occurs between storage clusters, the failure control can be performed by transmitting a control command to a counterpart cluster through an intermediary as described in JP 2022-122993 A or WO 2015/198449.

SUMMARY OF THE INVENTION

By the way, for a communication failure in an on-premises storage system, as described above, there is a measure for controlling the storage system when a communication failure occurs using the conventional technology disclosed in JP 2018-536229 T, JP 2022-122993 A, and WO 2015/198449. However, in a case of a storage system (storage system operating in a cloud environment) in which a plurality of computers are connected by a network across a plurality of data centers, there are the following problems that cannot be solved by the conventional technology.

In inter-data center communication in a cloud environment, billing occurs according to a communication volume, and a communication latency is larger than that in intra-data center communication. Therefore, in general, the volume provided by the storage system and the application using the volume are configured to be able to communicate in the same data center. When a communication failure occurs in the storage system configured as described above, the volume may move across the data center by stopping a part of the storage system by the failure control. As a result, in a case where the volume and the application are configured to cross the data centers after the failure control, the inter-data center communication occurs every I/O, and thus there is a problem that billing occurs or an increase in response occurs.

The present invention has been made in view of the above points, and an object of the present invention is to propose a computer system and a storage control method capable of executing failure control for suppressing occurrence of billing and an increase in response associated with I/O processing when a predetermined communication failure occurs in a storage system constructed across a plurality of data centers.

In order to solve such a problem, according to the present invention, there is provided a computer system that is configured by a plurality of computers disposed in a plurality of data centers in a network. The system includes: a compute node that executes an application; a storage node that includes a storage controller that processes I/O from the compute node and performs inputting/outputting to/from a storage device; and a storage cluster controller that controls the storage node. Storage controllers disposed in the different data centers form a pair, and another storage controller communicates via a communication path between the data centers to take over processing of one storage controller of the pair. An I/O monitor is provided which collects communication characteristics between the application and the storage controller, performs predetermined statistical processing, and generates statistical information. When a communication failure occurs in a communication path between the storage controllers forming the pair, a tie breaker included in the storage cluster controller decides failure control of taking over data input/output from one of the storage controllers forming the pair to another storage controller and stopping a storage node including the one storage controller based on statistical information of the communication characteristics of the storage controller generated by the I/O monitor, the storage cluster controller executes failure control determined by the tie breaker, and an application that has performed I/O to the storage controller of the stopped storage node sends I/O to the storage controller that has taken over the processing.

In order to solve such a problem, in the present invention, there is provided a storage control method executed by a computer system that is configured by a plurality of computers disposed in a plurality of data centers in a network. The computer system includes: a compute node that executes an application; a storage node that includes a storage controller that processes I/O from the compute node and performs inputting/outputting to/from a storage device; and a storage cluster controller that controls the storage node. Storage controllers disposed in the different data centers form a pair, and another storage controller communicates via a communication path between the data centers to take over processing of one storage controller of the pair. An I/O monitor is provided which collects communication characteristics between the application and the storage controller, performs predetermined statistical processing, and generates statistical information. When a communication failure occurs in a communication path between the storage controllers forming the pair, a tie breaker included in the storage cluster controller decides failure control of taking over data input/output from one of the storage controllers forming the pair to another storage controller and stopping a storage node including the one storage controller based on statistical information of the communication characteristics of the storage controller generated by the I/O monitor, the storage cluster controller executes failure control determined by the tie breaker, and an application that has performed I/O to the storage controller of the stopped storage node sends I/O to the storage controller that has taken over the processing.

According to the present invention, when a predetermined communication failure occurs in a storage system (for example, a storage system operating in a cloud environment) constructed across a plurality of data centers, failure control for suppressing occurrence of billing and an increase in response associated with I/O processing can be executed.

BRIEF DESCRIPTION OF THE DRAWINGS

FIG. 8 is a diagram illustrating an example of a storage controller layout table 212;

FIG. 9 is a diagram illustrating an example of a controller pair layout table 213;

FIG. 10 is a diagram illustrating an example of a compute node layout table 214;

FIG. 23 is a diagram illustrating an example of a volume layout table 412;

FIG. 24 is a diagram illustrating an example of a volume pair layout table 413;

DESCRIPTION OF THE PREFERRED EMBODIMENTS

Figure 1:
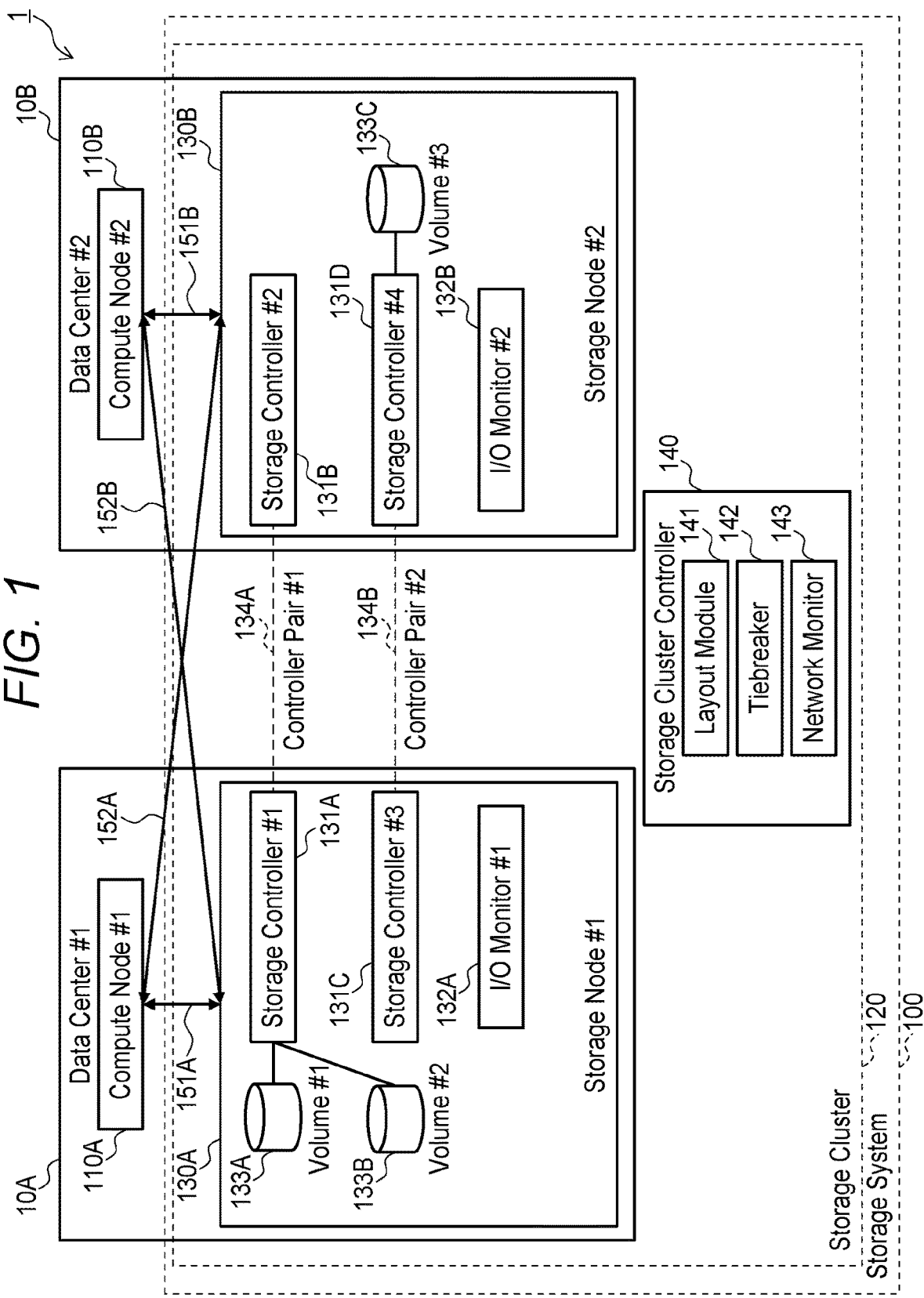
FIG. 1 is a conceptual diagram of a computer system 1 according to a first embodiment of the present invention.

Hereinafter, embodiments of the present invention will be described in detail with reference to the drawings.

Further, the following description and drawings are exemplifications for describing the present invention, and are omitted and simplified as appropriate for clarification of the description. In addition, not all combinations of features described in the embodiments are essential to the solution of the invention. The present invention is not limited to the embodiments, and all application examples consistent with the idea of the present invention are included in the technical scope of the present invention. Those skilled in the art can make various additions, modifications, and the like to the present invention within the scope of the present invention. The present invention can be implemented in other various forms. Unless otherwise limited, each component may be plural or singular.

In the following description, various types of information may be described using expressions such as "table", "chart", "list", and "queue". However, various types of information may be expressed by a data structure other than these. "XX table", "XX list", etc. may be called "XX information" to indicate that they do not depend on the data structure. In describing the contents of each piece of information, expressions such as "identification information", "identifier", "name", "ID", and "number" are used, but these can be replaced with each other.

In addition, in the following description, a process to be performed by executing a program may be described. However, the program is executed by at least one or more processors (for example, a CPU) so that a predetermined process is performed while using a storage resource (for example, memory) and/or an interface device (for example, communication port). Therefore, the subject of the process may be the processor. Similarly, the subject of the processing performed by executing a program may be a controller, a device, a system, a computer, a node, a storage system, a storage device, a server, a management computer, a client, or a host having a processor. The subject (for example, a processor) of the processing performed by executing a program may include a hardware circuit that performs a part or all of the processing. For example, the subject of the processing performed by executing a program may include a hardware circuit that performs encryption and decryption or compression and decompression. The processor operates as a functional unit that realizes a predetermined function by operating according to the program. A device and a system including a processor are a device and a system including these functional units.

The program may be installed on a device such as a computer from a program source. The program source may be, for example, a program distribution server or a computer-readable non-transitory storage medium. When the program source is a program distribution server, the program distribution server includes a processor (for example, a CPU) and a non-transitory storage resource, and the storage resource may further store a distribution program and a program to be distributed. Then, when the processor of the program distribution server executes the distribution program, the processor of the program distribution server may distribute the distribution target program to another computer. In addition, in the following description, two or more programs may be expressed as one program, or one program may be expressed as two or more programs.

In addition, in the following description, in a case where the same kind of elements are described without being distinguished, a common portion (a portion excluding a subscript or a branch number) of reference numerals including a subscript or a branch number is used, and in a case where the same kind of elements are described while being distinguished, reference numerals including a subscript or a branch number are used. For example, in a case where the storage nodes are described without being particularly distinguished, the storage nodes are described as "storage node 130", whereas in a case where the individual storage nodes 130 are described with being distinguished, the storage nodes are described with subscripts such as "storage node 130A" and "storage node 130B". In addition, an individual element may be described using an identifier (ID) or the like allocated to a target element. Specifically, for example, the storage node 130A may be referred to as a "storage node #1", and the storage node 130B may be referred to as a "storage node #2".

(1) First Embodiment

FIG. 1 is a conceptual diagram of a computer system 1 according to a first embodiment of the present invention. The computer system 1 illustrated in FIG. 1 includes a storage system 100 (storage cluster 120) in which a plurality of computers (servers to be described later) are coupled by a network, and a plurality of computers (compute nodes 110) using the storage system 100. The configuration of the storage system 100 (storage cluster 120) will be described in detail again after the description of FIGS. 2 to 4.

Figure 2:
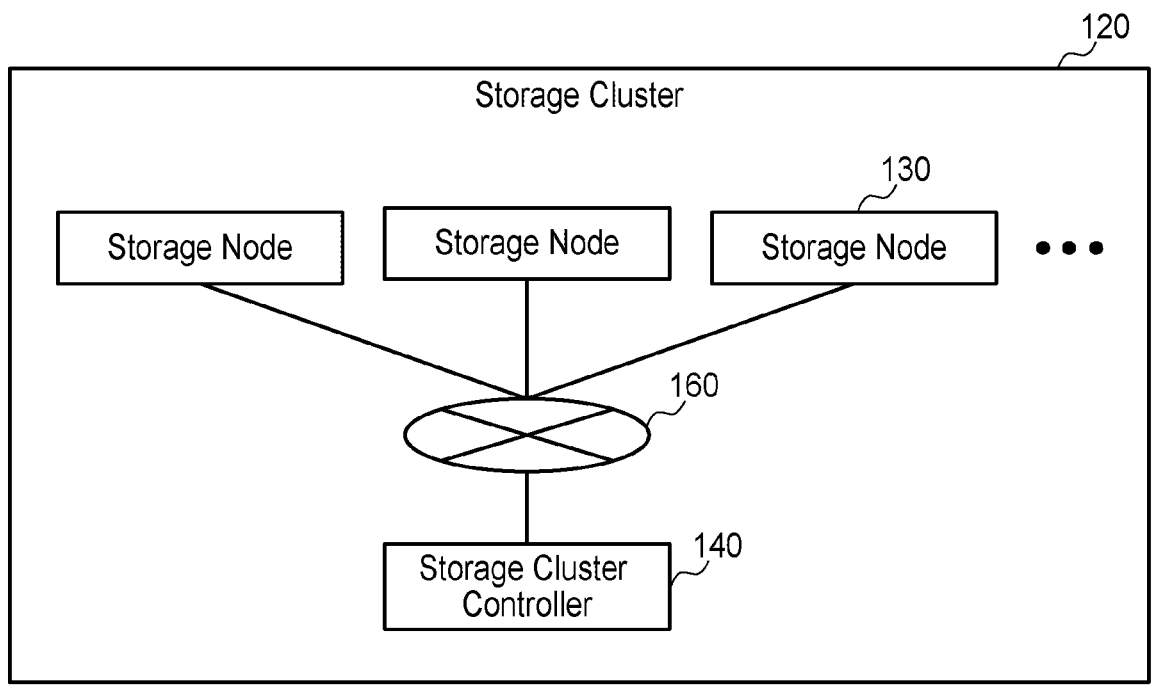
FIG. 2 is a conceptual diagram of a storage cluster 120.

FIG. 2 is a conceptual diagram of the storage cluster 120. As illustrated in FIG. 2, the storage cluster 120 is configured by connecting a plurality of storage nodes 130 and a storage cluster controller 140 by a network switch 160. The storage cluster controller 140 may implemented within the storage node 130. The configuration of the storage cluster illustrated in FIG. 2 is common to other embodiments described later. In the storage system 100 illustrated in FIG. 1, since one storage cluster 120 is configured as a whole, the storage cluster 120 may be read as the storage system 100, or vice versa.

Figure 3:
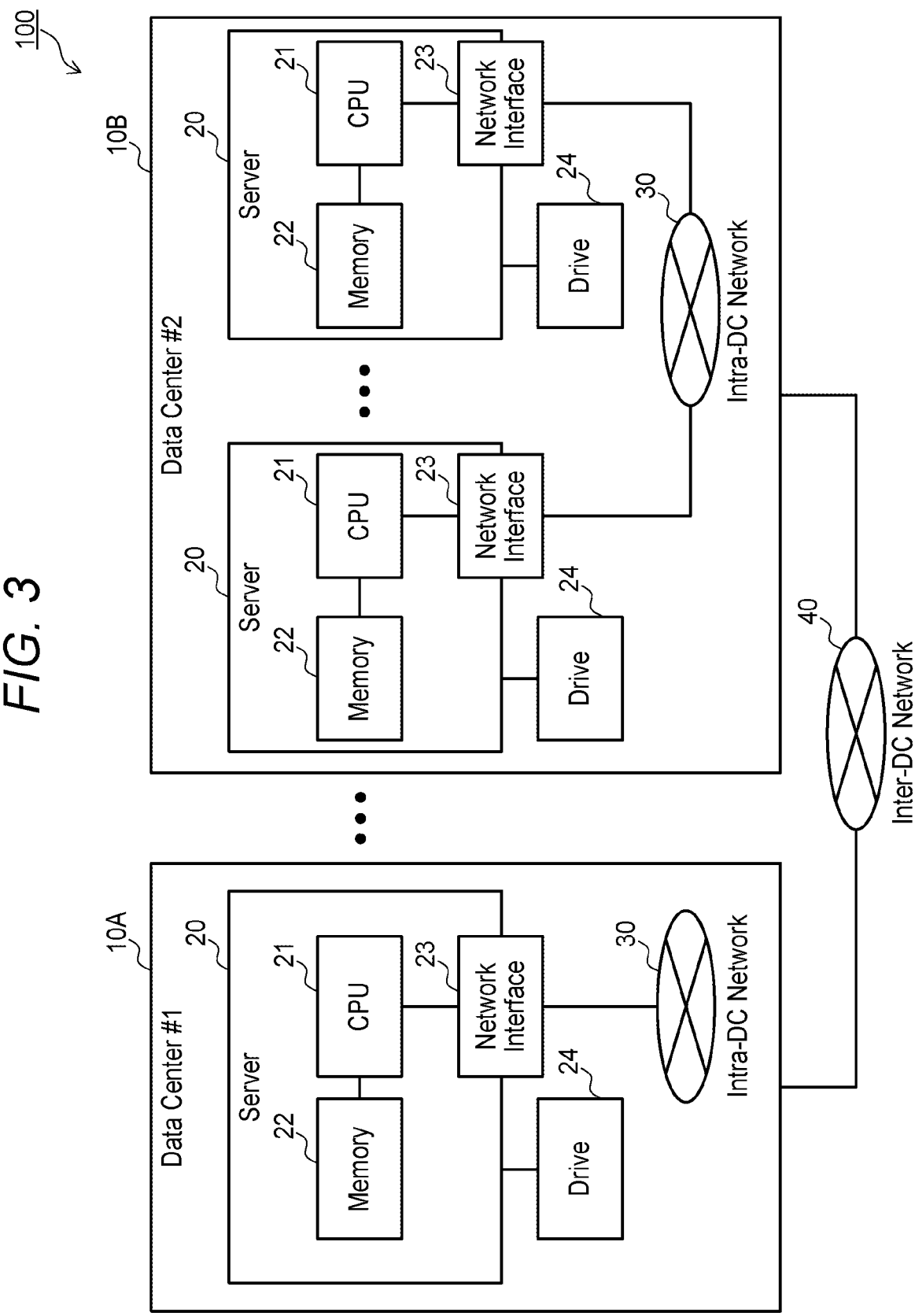
FIG. 3 is a diagram illustrating a hardware configuration example of a storage system 100.

FIG. 3 is a diagram illustrating a hardware configuration example of the storage system 100. As illustrated in FIG. 1, the storage system 100 is configured across a plurality of data centers 10, and in each data center 10, a plurality of servers 20 are connected by an intra-data center network (Intra-DC network) 30. The data centers 10 (for example, a data center #1 and a data center #2) are connected by an inter-data center network (inter-DC network) 40, so that the plurality of data centers 10 are communicably connected to each other.

The server 20 includes a CPU 21 that is a processor, a memory 22 that is a main storage device that stores programs and data executed by the CPU 21, a network interface 23 having a communication function between the server 20 and the outside, and a drive 24 that is an auxiliary storage device that stores programs and data. Note that the CPU 21 may be a processor other than a central processing unit (CPU). One storage node 130 corresponds to one server 20.

The storage nodes 130 and the storage cluster controller 140 constituting the storage cluster 120 are implemented on the server 20. The storage cluster 120 may be configured in a specific data center 10 or may be configured across a plurality of data centers 10. Specifically, for example, the storage cluster 120 may be configured in the data center 10A or may be configured by a plurality of data centers 10 such as the data centers 10A and 10B. The hardware configuration of the storage system described with reference to FIG. 3 is common to other embodiments described later.

Figure 4:
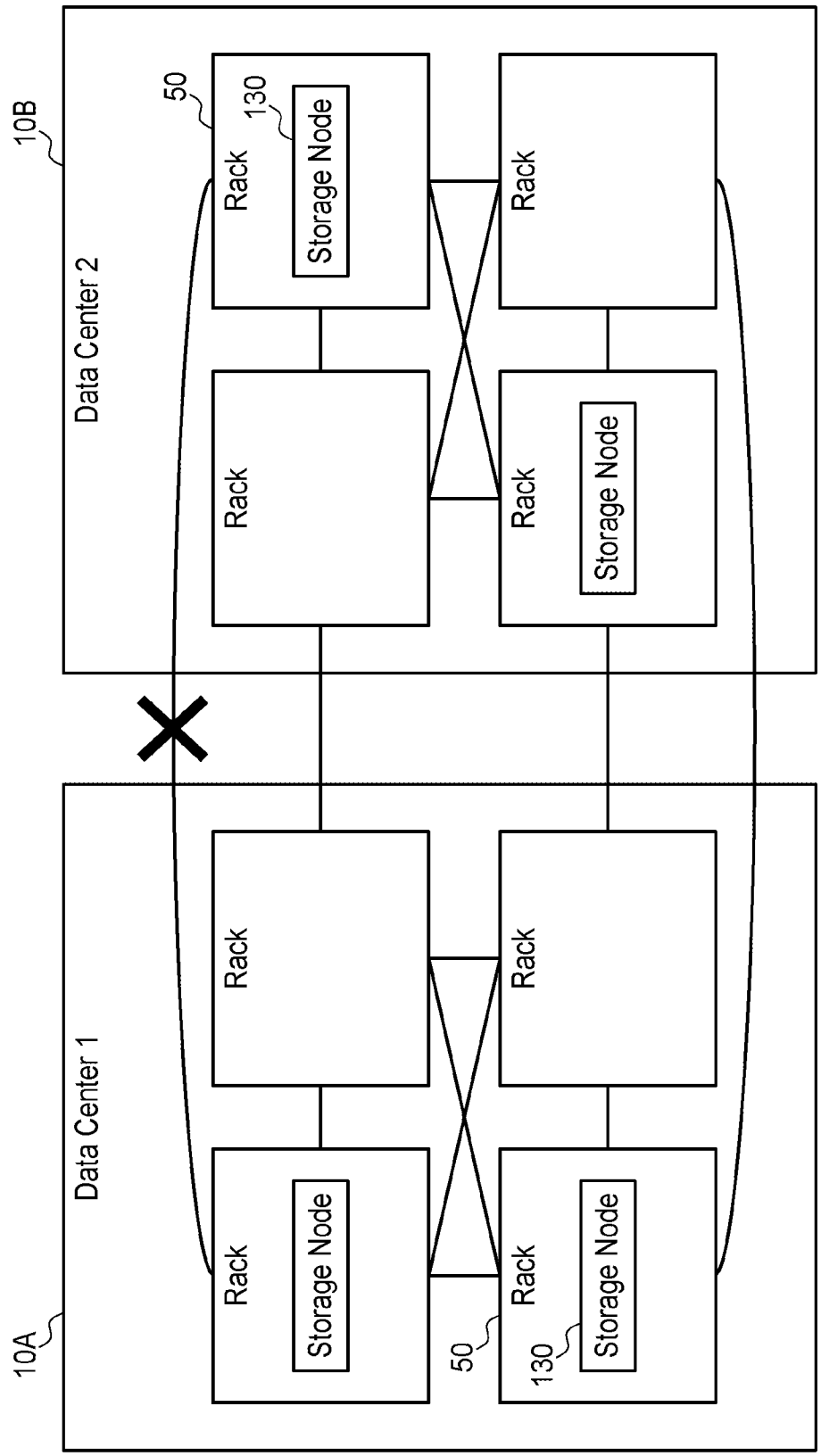
FIG. 4 is a diagram for explaining a communication failure in the storage system 100.

FIG. 4 is a diagram for explaining a communication failure in the storage system 100. As illustrated in FIG. 4, the data centers 10A and 10B that provide a cloud environment include a plurality of racks 50 such as storage racks, and are connected by a plurality of network paths. The plurality of storage nodes 130 included in the storage cluster 120 are disposed in different racks 50 in a distributed manner, and connections between the respective storage nodes 130 take different paths.

By configuring the communication path in the storage system 100 as described above, in a case where a failure (a cross mark illustrated in FIG. 4) occurs in one of the communication paths connecting the storage nodes 130, only a part of the storage node 130 on the data center #1 and the storage node 130 on the data center #2 becomes a communication failure (that is, only the communication of the communication path in which the failure has occurred is disconnected), and communication can be continued in the other communication paths. The configuration of the communication path of the storage system described with reference to FIG. 4 is common to other embodiments described later.

A configuration of the storage system 100 (storage cluster 120) configured by combining a plurality of computers (servers 20) via a network will be described in detail with reference to FIG. 1.

As illustrated in FIG. 1, the storage cluster 120 includes a storage node 130A, a storage node 130B, and a storage cluster controller 140.

The storage node 130A (storage node #1) includes storage controllers 131A and 131C and an I/O monitor 132A, and is disposed in a data center 10A. The storage node 130B (storage node #2) includes storage controllers 131B and 131D and an I/O monitor 132B, and is disposed in a data center 10B.

The storage cluster controller 140 is a controller that controls the entire storage cluster 120, and includes a layout module 141, a tie breaker 142, and a network monitor 143. The storage cluster controller 140 is executed, for example, on the data center 10 different from the data centers 10A and 10B, and is connected to the storage nodes 130A and 130B disposed in each data center 10 by the inter-data center network 40. As described above, the storage cluster controller 140 may be configured to be executed on the data center 10A or the data center 10B. In this case, the application using the distributed algorithm may share the configuration information and the control command of the storage cluster 120 with the data centers 10A and 10B and the third data center 10.

The storage controller 131 manages a volume 133 by forming a pair (controller pair 134) between the storage controllers 131 across the data center #1 and the data center #2.

For example, a controller pair 134A (controller pair #1) includes a storage controller 131A (storage controller #1) and a storage controller 131B (storage controller #2), and has an active-standby configuration. Normally, the storage controller #1 manages volumes 133A and 133B (volumes #1 and #2) in the active state. The storage controller #2 normally stands by in a standby state, and when the storage controller #1 of the pair partner is stopped, the storage controller #2 enters an active state and takes over the management of the volumes #1 and #2. Similarly, a storage controller 131C (storage controller #3) and a storage controller 131D (storage controller #4) forming a controller pair 134B (controller pair #2) also adopt the active-standby configuration. Normally, the storage controller #4 manages a volume 133C (volume #3) in the active state. The storage controller #3 normally stands by in a standby state, and when the storage controller #4 of the pair partner is stopped, the storage controller #3 enters an active state and takes over the management of the volume #3.

A compute node 110A (compute node #1) is an application that uses the storage system 100, and operates on the data center 10A. As illustrated in FIG. 1, the compute node 110A and the storage system 100 are connected by an intra-data center path 151A and an inter-data center path 152A, and access from the compute node 110A to the volume 133 (133A, 133B, 133C) can be performed via these paths.

A compute node 110B (compute node #2) is an application that uses the storage system 100, and operates on the data center 10B. As illustrated in FIG. 1, the compute node 110B and the storage system 100 are connected by an intra-data center path 151B and an inter-data center path 152B, and access from the compute node 110B to the volume 133 (133A, 133B, 133C) can be performed via these paths.

The intra-data center path 151 is a communication path in the same data center 10, and when the access from the compute node 110 to the volume 133 is intra-data center communication via only the intra-data center path 151, no charging in the cloud environment occurs.

The inter-data center path 152 is a communication path between different data centers 10, and when the access from the compute node 110 to the volume 133 is inter-data center communication via the inter-data center path 152, charging in a cloud environment occurs, for example, according to a communication volume.

Figure 5:
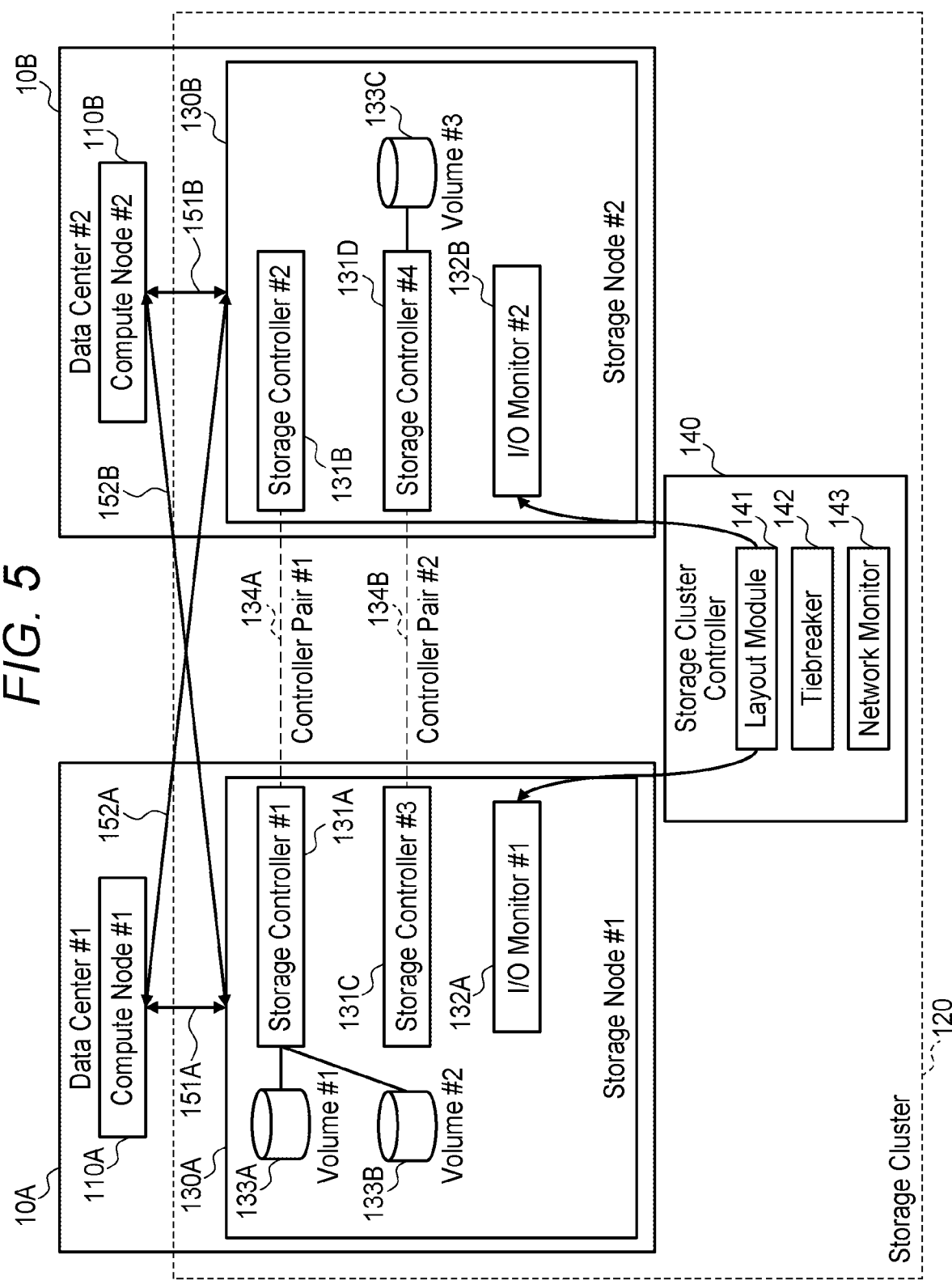
FIG. 5 is a conceptual diagram for explaining collection of I/O log information in the storage system 100.

FIG. 5 is a conceptual diagram for explaining collection of I/O log information in the storage system 100.

As illustrated in FIG. 5, when an I/O arrives from the compute nodes 110A and 110B to the volume 133 (the volume #1 or the volume #2) managed by the storage controller #1 disposed in the data center #1, the storage controller #1 transmits log information of the I/O to an I/O monitor #1. Then, the I/O monitor #1 uses the received log information of the I/O and the information of the layout module 141 of the storage cluster controller 140 to determine whether the I/O is intra-data center communication or inter-data center communication, and then records the log information of the I/O.

Similarly, when I/O arrives from the compute nodes 110A and 110B to the volume 133 (volume #3) managed by the storage controller #2 disposed in the data center #2, the storage controller #2 transmits log information of the I/O to an I/O monitor #2. Then, the I/O monitor #2 uses the received log information of the I/O and the information of the layout module 141 of the storage cluster controller 140 to determine whether the I/O is intra-data center communication or inter-data center communication, and then records the log information of the I/O.

With the above configuration, in each storage node 130, the I/O monitor 132 can accumulate and hold the log information of the I/O with respect to the volume 133 in cooperation with the storage controller 131 (I/O statistical information).

Figure 6:
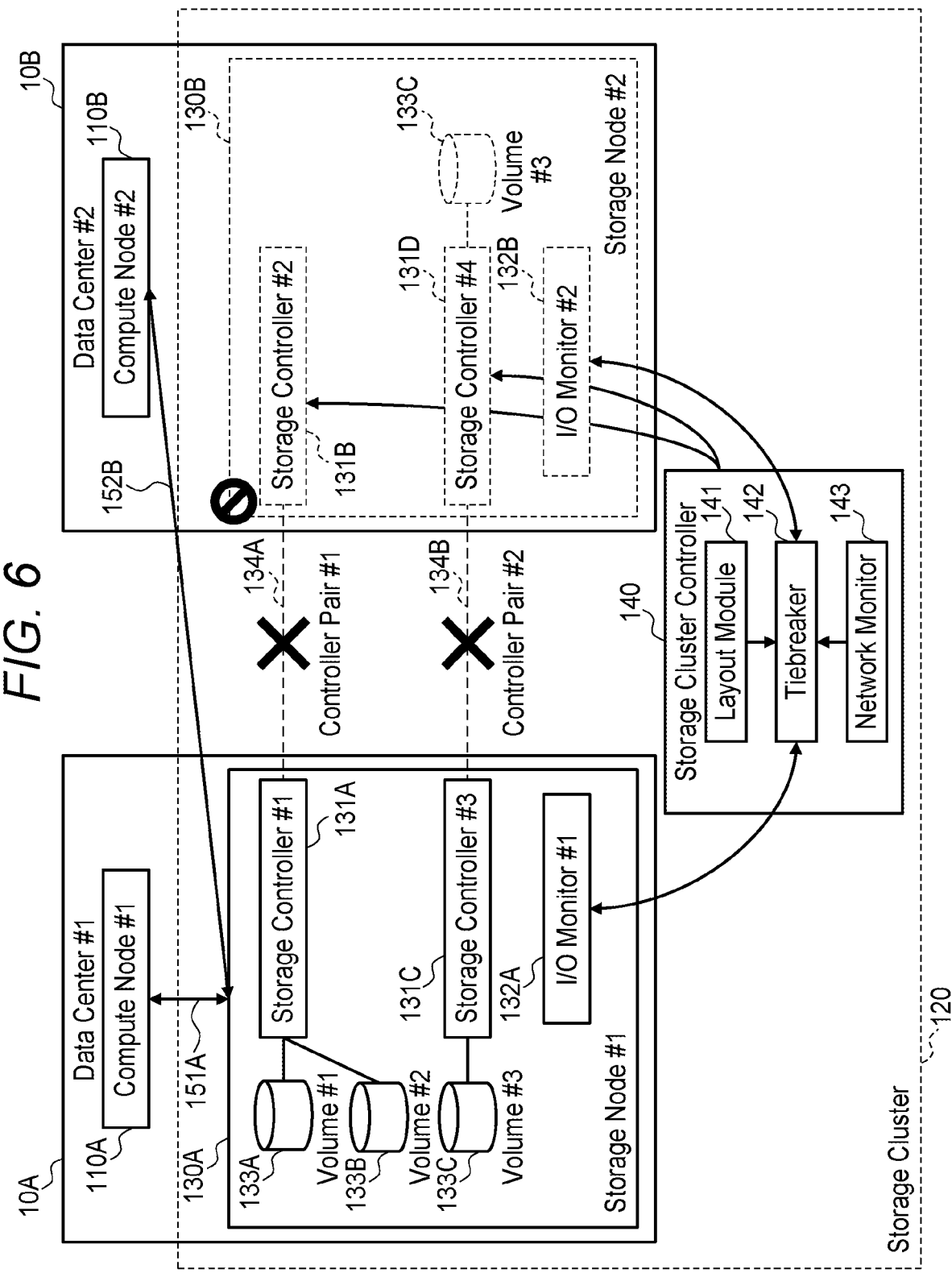
FIG. 6 is a conceptual diagram of communication failure control according to the first embodiment.

FIG. 6 is a conceptual diagram of communication failure control according to the first embodiment. The communication failure control means control performed when a communication failure occurs, and is hereinafter also referred to as failure control. The state of the storage cluster 120 illustrated in FIG. 6 is a state in which the controller pair #1 and the controller pair #2 are disconnected due to a failure in the communication path between the storage node #1 and the storage node #2. In a case where communication between the controller pairs becomes impossible as described above, the storage system 100 according to the first embodiment stops all the storage controllers 131 belonging to the storage node #1 or the storage node #2, and stops the storage node #1 or the storage node #2.

More specifically, control upon occurrence of a communication failure will be described. When the communication failure occurs as described above, first, a network monitor 143 operating on the storage cluster controller 140 detects that the controller pair #1 and the controller pair #2 become uncommunicable, and requests the tie breaker 142 to stop the related storage controllers 131.

Next, the tie breaker 142 acquires the configuration information of the storage system 100 from the layout module 141, and further acquires the I/O statistical information of the storage controllers #1 and #4 (the storage controller 131 in an active state in the disconnected controller pair 134) from the I/O monitors #1 and #2.

Then, the tie breaker 142 determines a stopping method of the storage controller 131 based on the acquired information such that the inter-data center communication volume (throughput) after stopping the storage nodes #1 and #2 is minimized, and requests the storage cluster controller 140 to perform control in accordance with the determined stopping method. For example, in the case of FIG. 6, the tie breaker 142 determines that the inter-data center communication volume (throughput) is minimized when the storage node #2 is stopped, and requests the storage cluster controller 140 to stop the storage controllers #2 and #4 included in the storage node #2 according to the determination result.

Then, the storage cluster controller 140 performs control to stop the storage controller 131 according to a request from the tie breaker 142, and stops the storage node 130 (in this example, the storage node #2) to which one of the controller pair that has become uncommunicable belongs. As a result, as illustrated in FIG. 6, in the controller pair #1, the storage controller #2 in the standby state is stopped, and the storage controller #1 continues the operation (management of volumes #1 and #2) in the active state. In the controller pair #2, the storage controller #4 in the active state is stopped, the storage controller #3 changes from the standby state to the active state, and takes over the management of the volume #3.

As a result of the communication failure control described above, the path of the compute node #1 for the storage system 100 becomes the intra-data center path 151A, and the path of the compute node #2 for the storage system 100 becomes the inter-data center path 152B. At this time, when the communication volumes of the two paths associated with the I/O processing are compared, the communication volume of the intra-data center path 151A is larger than the communication volume of the inter-data center path 152, and the charge generated in the inter-data center communication via the inter-data center path 152 is minimized.

Figure 7:
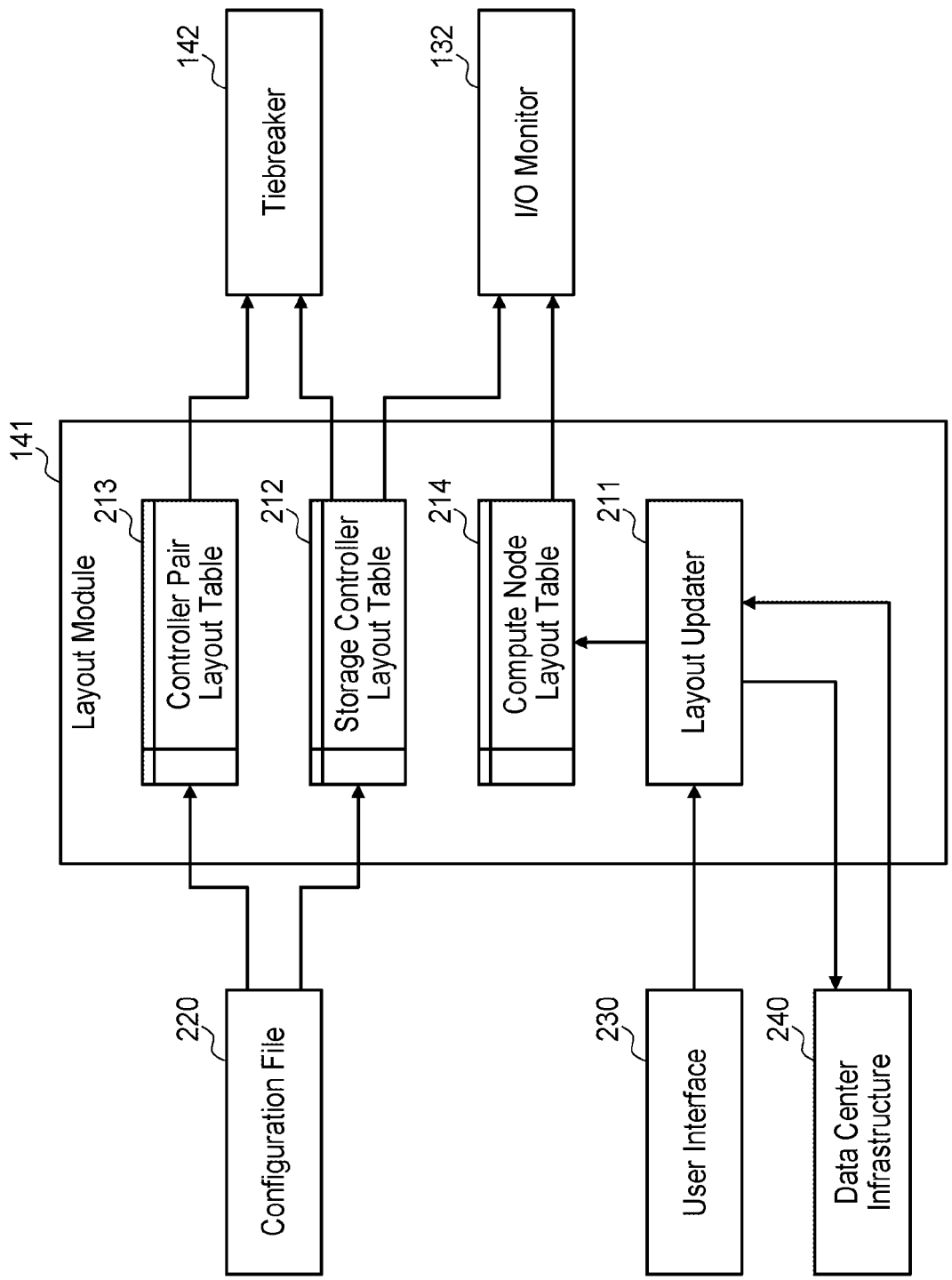
FIG. 7 is a diagram illustrating a configuration example of a layout module 141.

FIG. 7 is a diagram illustrating a configuration example of the layout module 141. As illustrated in FIG. 7, the layout module 141 includes a layout updater 211, a storage controller layout table 212, a controller pair layout table 213, and a compute node layout table 214.

The storage controller layout table 212 is data for managing the arrangement information of the storage controller 131, receives the arrangement information of the storage controller 131 as an input from a configuration file 220 which holds the configuration information of the storage cluster 120, and holds the arrangement information. When the arrangement information of the storage controller 131 held in the storage controller layout table 212 is updated, the layout module 141 transmits the updated information to the tie breaker 142 and the I/O monitor 132. The storage location of the configuration file 220 is, for example, in the storage cluster controller 140, but is not particularly limited.

FIG. 8 is a diagram illustrating an example of the storage controller layout table 212. In the case of FIG. 8, the storage controller layout table 212 includes a data center ID 2121 indicating an identifier (data center ID) allocated to each data center 10, a storage node ID 2122 indicating an identifier (storage node ID) allocated to each storage node 130, and a storage controller ID 2123 indicating an identifier (storage controller ID) allocated to each storage controller 131. These pieces of information can be acquired from the configuration file 220, and the storage node 130 and the data center 10 to which the storage controller 131 belongs can be known.

The controller pair layout table 213 is data for managing information related to the controller pair 134, receives information related to the controller pair 134 as an input from the configuration file 220 which holds the configuration information of the storage cluster 120, and holds the information. When the information of the controller pair 134 held in the controller pair layout table 213 is updated, the layout module 141 transmits the updated information to the tie breaker 142.

FIG. 9 is a diagram illustrating an example of the controller pair layout table 213. In the case of FIG. 9, the controller pair layout table 213 includes a controller pair ID 2131 indicating an identifier (controller pair ID) allocated to each controller pair 134, an active storage controller ID 2132 indicating the storage controller ID of the storage controller 131 that is in an active state in the controller pair 134, and a standby storage controller ID 2133 indicating the storage controller ID of the storage controller 131 that is in a standby state in the controller pair 134. These pieces of information can be acquired from the configuration file 220, and the storage controllers 131 forming the controller pair 134 and their states (active state or standby state) can be known.

The compute node layout table 214 is data for managing arrangement information of the compute nodes 110, and receives the arrangement information of the compute nodes 110 from the layout updater 211 as an input and holds the same. When the arrangement information of the compute nodes 110 held in the compute node layout table 214 is updated, the layout module 141 sends the updated information to the I/O monitor 132.

Figure 11:
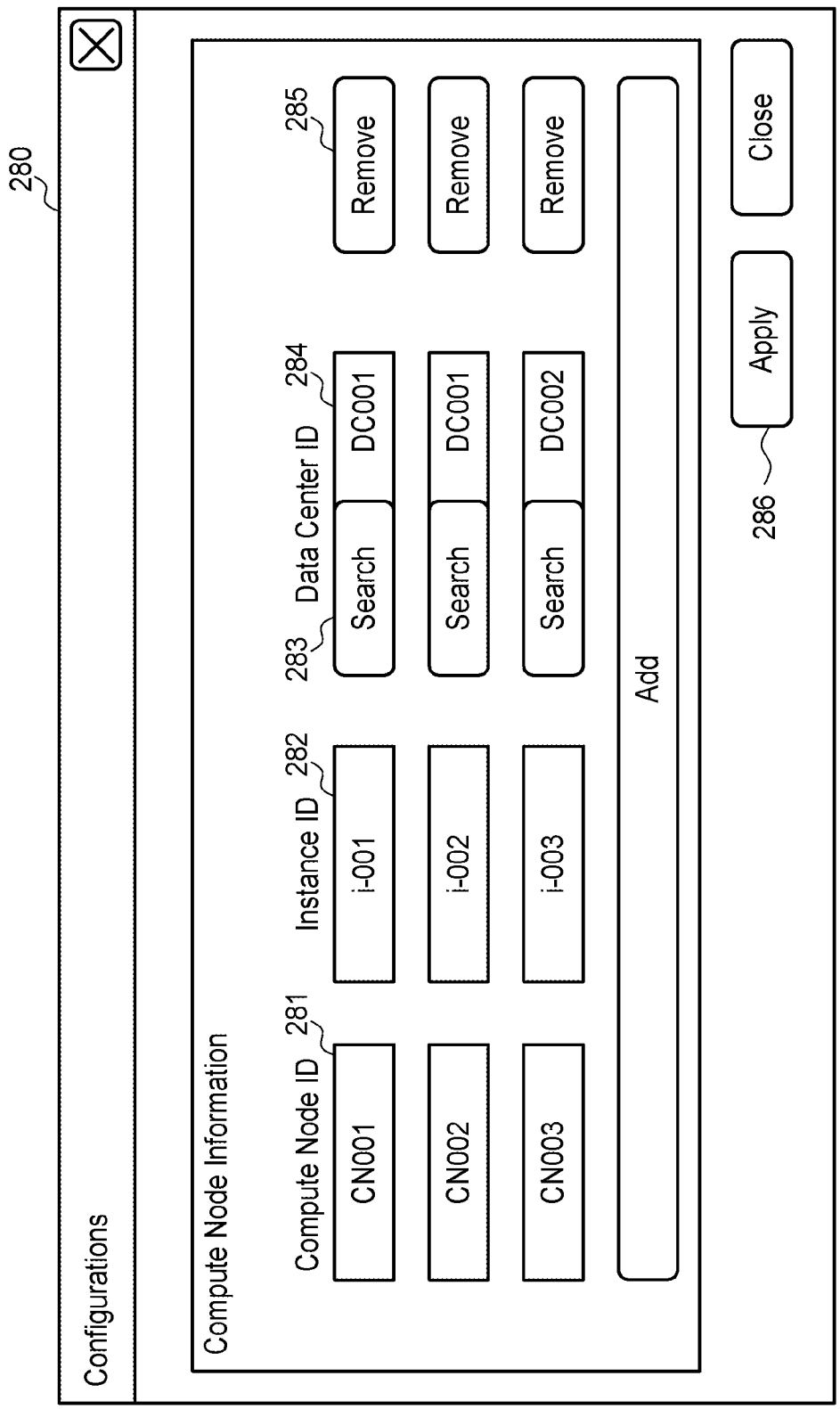
FIG. 11 is a diagram illustrating an example of a registration screen of compute node information.

The layout updater 211 has a function of updating arrangement information of the compute nodes 110 held in the compute node layout table 214. The layout updater 211 may be software or hardware. The layout updater 211 receives an input of a compute node ID (identifier of the compute node 110) and an instance ID from a user interface 230 on which a user can perform an input operation, inquires of a data center infrastructure 240 about arrangement information of the compute node 110 (information of the data center 10 to which the compute node 110 belongs), and sends processing results thereof to the compute node layout table 214. Note that information obtained by the layout updater 211 making an inquiry to the data center infrastructure 240 may be provided from the user interface 230 to the user side. FIG. 11 described below illustrates an example of a registration screen of compute node information provided by the user interface 230 to the user.

Note that the instance ID refers to server management information in the data center infrastructure 240, and an instance ID is attached to a server executing the compute node 110 or the like or a virtual machine executed on the server. The data center infrastructure 240 is a cloud function provided by the data center 10.

FIG. 10 is a diagram illustrating an example of the compute node layout table 214. In the case of FIG. 10, the compute node layout table 214 includes a data center ID 2141 indicating a data center ID, and a compute node ID 2142 indicating an identifier (compute node ID) allocated to an individual compute node 110. These pieces of information can be acquired from the user interface 230 and the data center infrastructure 240 via the layout updater 211 as described above, and the data center 10 to which the compute node 110 belongs can be known.

FIG. 11 is a diagram illustrating an example of a registration screen of compute node information. A registration screen 280 illustrated in FIG. 11 is an information input screen provided to the user by the user interface 230, and is displayed on a display or the like connected to the storage cluster 120 via a network. When the user performs a predetermined operation on the registration screen 280, information regarding the compute node 110 is additionally input, and the information held in the compute node layout table 214 of the layout module 141 is updated.

The registration screen 280 illustrated in FIG. 11 includes an input field 281 for inputting the compute node ID, an input field 282 for inputting the instance ID, a search button 283 for searching for the data center ID of the data center 10 to which the compute node 110 belongs, an output field 284 in which the data center ID is displayed through the operation of the search button 283, a deletion button 285 for deleting input/output contents of a target row, and an apply button 286 for applying (registering) arrangement information of the compute node 110 based on the input/output contents displayed on the registration screen 280 to the compute node layout table 214.

On the registration screen 280, when the user inputs the compute node ID and the instance ID in the input fields 281 and 282 and then presses the search button 283, the layout updater 211 inquires of the data center infrastructure 240 using the instance ID, and arrangement information (data center ID) of the compute node 110 is obtained and displayed in the output field 284. Then, when the user presses the apply button 286, the layout updater 211 transmits the input/output contents (compute node ID and data center ID) displayed on the registration screen 280 together to the compute node layout table 214, and the information is applied (registered).

Figure 12:
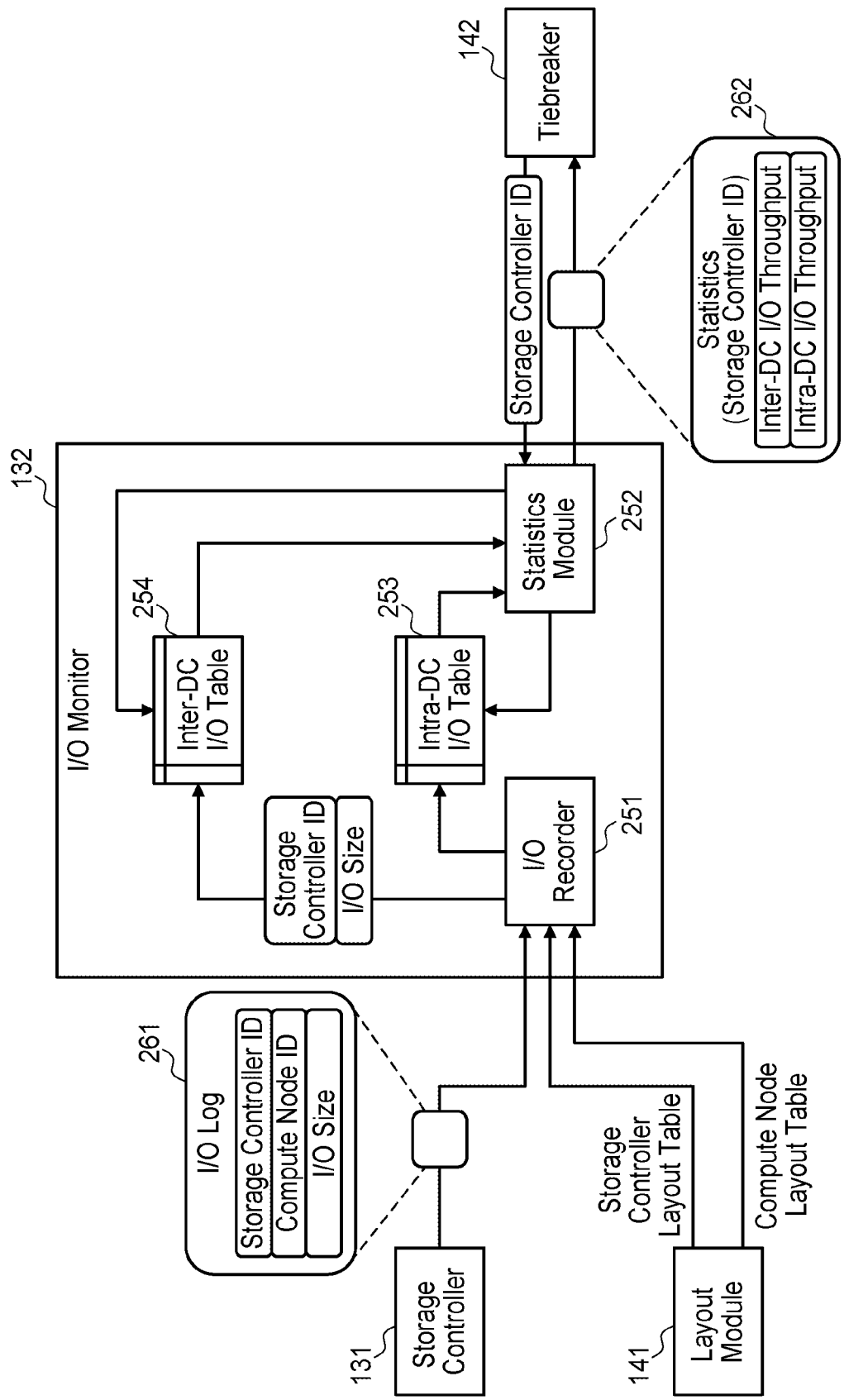
FIG. 12 is a diagram illustrating a configuration example of an I/O monitor 132.

FIG. 12 is a diagram illustrating a configuration example of the I/O monitor 132. As illustrated in FIG. 12, the I/O monitor 132 includes an I/O recorder 251, a statistics module 252, an intra-data center I/O table 253, and an inter-data center I/O table 254.

The I/O recorder 251 has a function of identifying whether the I/O log received from the storage controller 131 is intra-data center communication or inter-data center communication, and transmitting the I/O log to a table corresponding to the identification result. The I/O recorder 251 may be software or hardware.

More specifically, the I/O recorder 251 first receives and stores information of the storage controller layout table 212 and the compute node layout table 214 from the layout module 141.

Upon receiving the I/O log (I/O log 261) from the storage controller 131, the I/O recorder 251 refers to the storage controller ID 2123 of the storage controller layout table 212 and the compute node ID 2142 of the compute node layout table 214 to identify whether the I/O has been processed through the intra-data center communication or the inter-data center communication. The I/O log includes a storage controller ID, a compute node ID, and an I/O size, for example, as in the I/O log 261 illustrated in FIG. 12.

Figure 14:
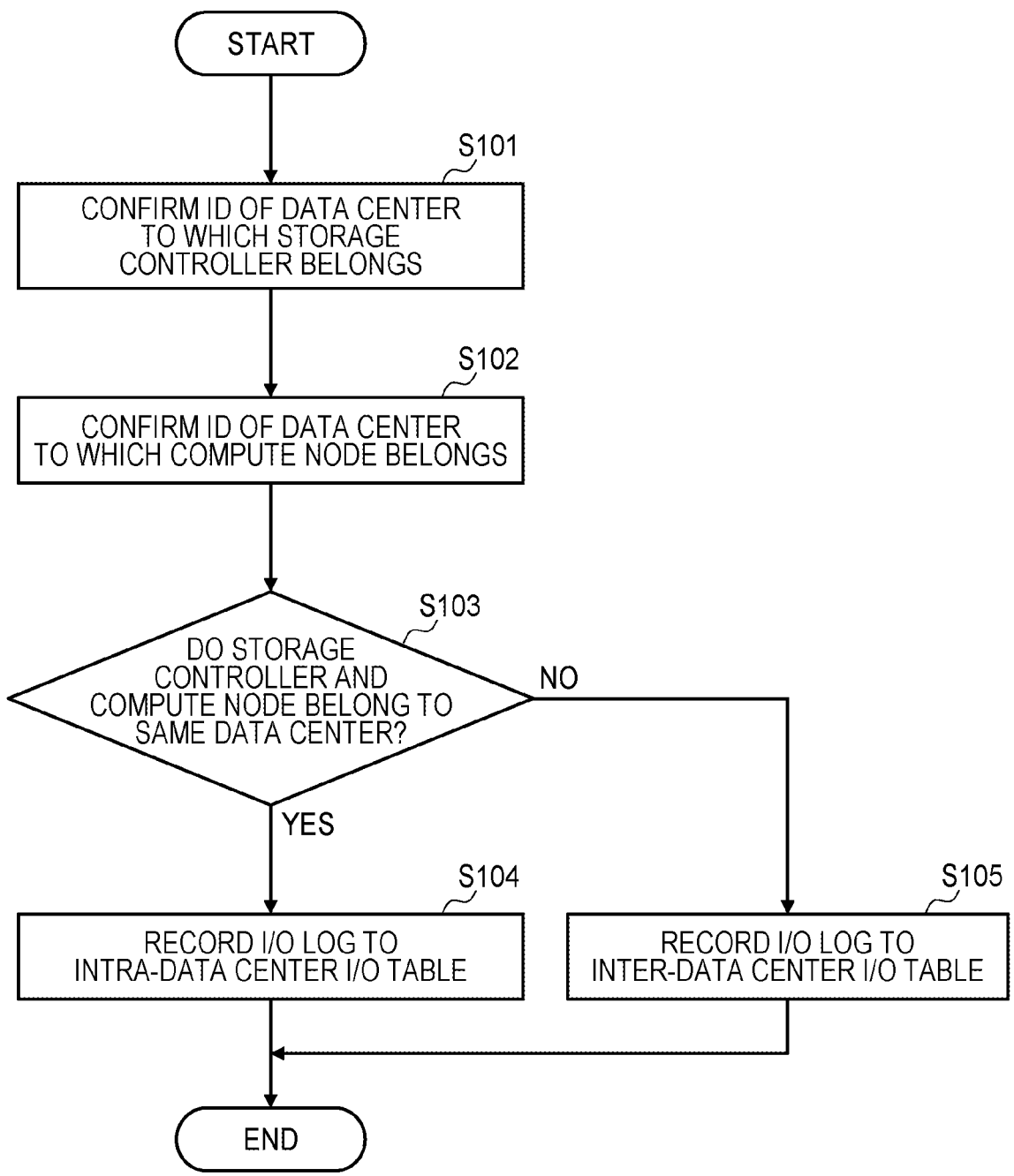
FIG. 14 is a flowchart illustrating a processing procedure example of communication characteristics recording processing according to the first embodiment.

Then, according to the result of the identification, the I/O recorder 251 sends the I/O log to the intra-data center I/O table 253 in the case of the I/O processed by the intra-data center communication, and sends the I/O log to the inter-data center I/O table 254 in the case of the I/O processed by the inter-data center communication. FIG. 14 described later illustrates details of processing (communication characteristics recording processing) by the I/O recorder 251 described above.

Figure 13:
FIG. 13 is a diagram illustrating an example of an I/O information record 255.

The intra-data center I/O table 253 records the log information of the I/O processed by the intra-data center communication received from the I/O recorder 251 (see an I/O information record 255 illustrated in FIG. 13). The intra-data center I/O table 253 increments and holds the I/O size for each storage controller ID. When a reset signal is received from the statistics module 252, the intra-data center I/O table 253 resets the held I/O size to 0.

The inter-data center I/O table 254 records the log information of the I/O processed by the inter-data center communication received from the I/O recorder 251. The inter-data center I/O table 254 increments and holds the I/O size for each storage controller ID. When the reset signal is received from the statistics module 252, the inter-data center I/O table 254 resets the held I/O size to 0.

The statistics module 252 is a program having a function of responding I/O statistical information (an I/O communication volume of intra-data center communication and an I/O communication volume of inter-data center communication) corresponding to the designated storage controller ID in response to a request from the tie breaker 142.

More specifically, upon receiving the storage controller ID from the tie breaker 142, the statistics module 252 reads the I/O size corresponding to the storage controller ID from each of the intra-data center I/O table 253 and the inter-data center I/O table 254.

Then, the statistics module 252 divides (calculates division) each read I/O size by the elapsed time from the previous reset of each table to convert the read I/O size into the communication volume (throughput) of the intra-data center communication associated with the I/O processing and the communication volume (throughput) of the inter-data center communication associated with the I/O processing, and replies to the tie breaker 142 with the conversion results as statistical information (I/O statistical information 262). As illustrated in FIG. 12, the I/O statistical information 262 includes the intra-data center communication volume (intra-data center I/O throughput) and the inter-data center communication volume (inter-data center I/O throughput) for each storage controller ID.

In addition, the statistics module 252 sends a reset signal to the intra-data center I/O table 253 and the inter-data center I/O table 254 at a timing when a reset request is received from the tie breaker 142 or at regular intervals, and causes the I/O size held in each table to be reset to 0.

Note that, in a case where a reset request is received from the tie breaker 142 immediately after the I/O size is reset by periodic processing or the like, the I/O size is recorded only for a short time, and there is a possibility that sufficient I/O statistical information for determining a method for stopping the storage controller 131 to minimize the inter-data center communication volume cannot be obtained. Therefore, in a case where the reset is performed at regular intervals, it is preferable to hold the I/O size before the reset for a predetermined period.

FIG. 13 is a diagram illustrating an example of the I/O information record 255. The I/O information record 255 is data in which I/O log information held in each of the intra-data center I/O table 253 and the inter-data center I/O table 254 is recorded. In the case of FIG. 13, the I/O information record 255 includes a storage controller ID 2551 indicating a storage controller ID, and an I/O size 2552 indicating a cumulative total of I/O data amounts processed by the storage controller 131. In the I/O information record 255 (intra-data center I/O table 253, inter-data center I/O table 254), the processed I/O size is incremented and held in the I/O size 2552 in units of the storage controller 131, and when a reset signal from the statistics module 252 is received, the value of the I/O size 2552 is reset to 0.

FIG. 14 is a flowchart illustrating a processing procedure example of communication characteristics recording processing in the first embodiment. The communication characteristics recording processing illustrated in FIG. 14 is a process in which the I/O monitor 132 (particularly, the I/O recorder 251) records the I/O log in the intra-data center I/O table 253 or the inter-data center I/O table 254 as a record of the communication characteristics accompanying the I/O processing for each storage controller 131 in the storage system 100, and the process is started when the I/O log is received from the storage controller 131.

According to FIG. 14, first, the I/O monitor 132 confirms the data center ID of the data center 10 to which the storage controller 131 indicated by the storage controller ID belongs based on the storage controller ID included in the I/O log (step S101). When the data center ID is confirmed from the storage controller ID, the storage controller layout table 212 illustrated in FIG. 8 may be referred to.

Next, based on the compute node ID included in the I/O log, the I/O monitor 132 confirms the data center ID of the data center 10 to which the compute node 110 indicated by the compute node ID belongs (step S102). When the data center ID is confirmed from the compute node ID, the compute node layout table 214 illustrated in FIG. 10 may be referred to. The execution order of step S101 and step S102 is not particularly limited, and may be processed in parallel.

Next, the I/O monitor 132 compares the data center IDs confirmed in steps S101 and S102, and determines whether the storage controller 131 and the compute node 110 indicated in the I/O log belong to the same data center 10 (step S103).

When it is determined in step S103 that the storage controller 131 and the compute node 110 belong to the same data center 10 (YES in step S103), the I/O monitor 132 records the I/O log received at the start of processing in the intra-data center I/O table 253 (step S104), and ends the communication characteristics recording processing.

On the other hand, when it is determined in step S103 that the storage controller 131 and the compute node 110 belong to different data centers 10 (NO in step S103), the I/O monitor 132 records the I/O log received at the start of processing in the inter-data center I/O table 254 (step S105), and ends the communication characteristics recording processing.

Figure 15:
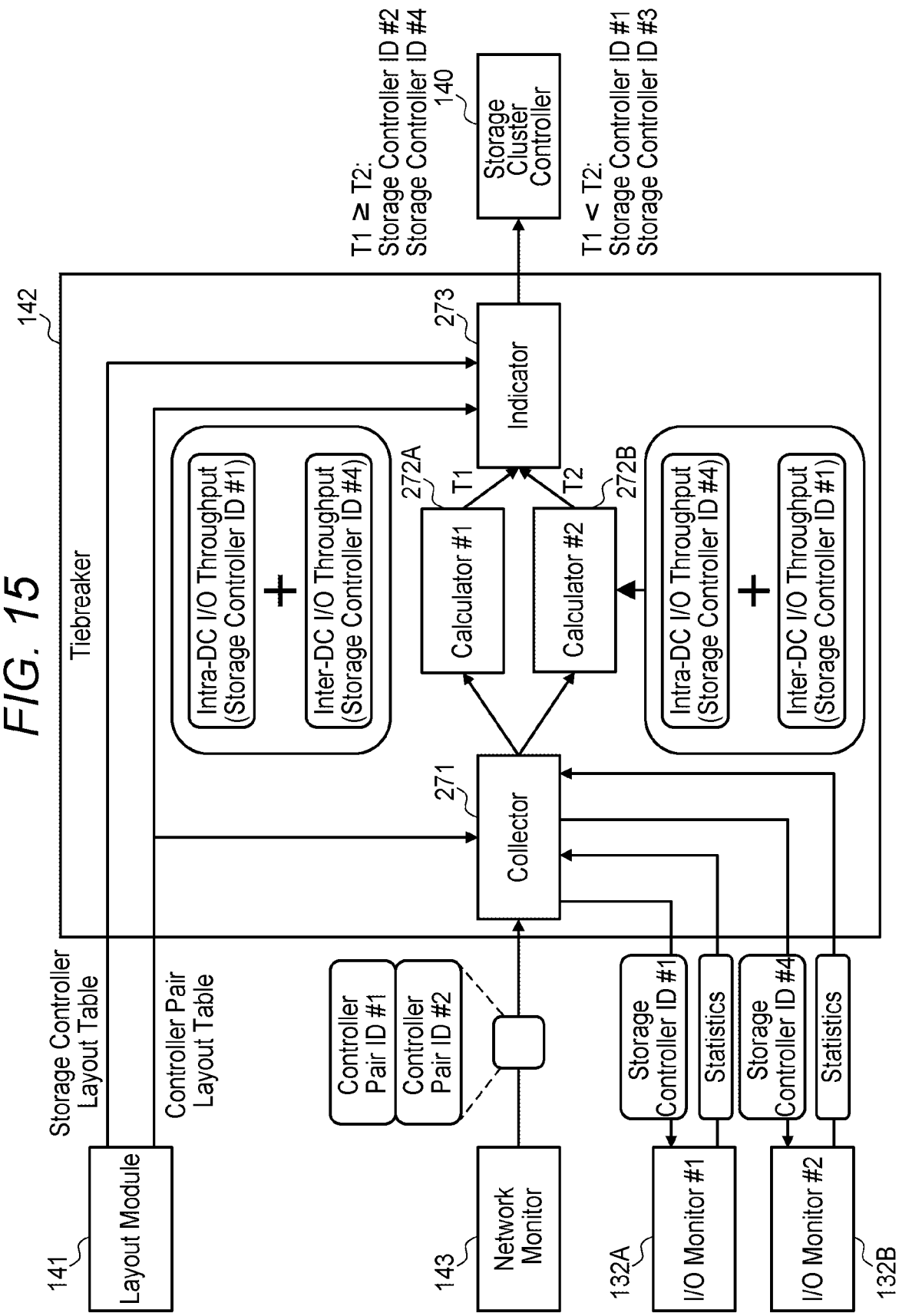
FIG. 15 is a diagram illustrating a configuration example of a tie breaker 142.

FIG. 15 is a diagram illustrating a configuration example of the tie breaker 142. As illustrated in FIG. 15, the tie breaker 142 includes a collector 271, a computer 272 (272A, 272B), and an indicator 273. Each of these components may be realized by software or hardware.

The collector 271 has a function of receiving and holding information of the controller pair layout table 213 from the layout module 141, and further has a function of performing the following processing when receiving a controller pair ID that requires failure control from the network monitor 143.

When receiving two controller pair IDs that require failure control from the network monitor 143 that has detected a communication failure between storage nodes, the collector 271 inquires of the I/O monitors 132A and 132B about I/O statistical information for the storage controller ID in the active state. Then, when receiving the I/O statistical information (the I/O statistical information 262 illustrated in FIG. 12) inquired from the I/O monitors 132A and 132B, the collector 271 transmits the information to the computers 272A and 272B.

As a specific example, FIG. 15 illustrates that the collector 271 receives a controller pair ID #1 and a controller pair ID #2 from the network monitor 143, recognizes a storage controller ID #1 and a storage controller ID #4 as the IDs of the storage controllers in the active state, inquires of the I/O monitor 132A about the I/O statistical information about the storage controller ID #1, and inquires of the I/O monitor 132B about the I/O statistical information about the storage controller ID #4.

The computer 272 (272A, 272B) has a function of calculating an inter-data center communication volume (inter-data center I/O throughput) when the storage controller 131 to be subjected to the failure control is stopped based on the I/O statistical information, and transmitting the inter-data center communication volume to the indicator 273.

Specifically, in the case of FIG. 15, the computer 272A refers to the I/O statistical information to add the I/O throughput of the intra-data center communication in the storage controller ID #1 and the I/O throughput of the inter-data center communication in the storage controller ID #4 in order to calculate the inter-data center communication volume ("T1" in FIG. 15) when the storage controller (the storage controller #1 illustrated in FIG. 1) of the storage controller ID #1 is stopped. In addition, the computer 272B refers to the I/O statistical information and adds the I/O throughput of the intra-data center communication in the storage controller ID #4 and the I/O throughput of the inter-data center communication in the storage controller ID #1 in order to calculate the inter-data center communication volume ("T2" in FIG. 15) when the storage controller (the storage controller #4 illustrated in FIG. 1) of the storage controller ID #4 is stopped.

The indicator 273 has a function of receiving and holding information of the storage controller layout table 212 and the controller pair layout table 213 from the layout module 141, and further has a function of performing the following processing when receiving a calculation result (T1 and T2 in FIG. 15) of the throughput between the data centers when the storage controller in the active state is stopped from the computers 272A and 272B.

The indicator 273 compares the inter-data center communication volume (inter-data center I/O throughput) T1 received from the computer 272A with the inter-data center communication volume (inter-data center I/O throughput) T2 received from the computer 272B, determines to stop the storage controller 131 so that the inter-data center communication volume (throughput) decreases, and requests the storage cluster controller 140 to stop the target storage controller 131 according to the determination result.

In the specific example illustrated in FIG. 15, when the value of T1 is large (T1>T2), the indicator 273 determines to stop all the storage controllers 131 of the storage node (storage node #2) to which the storage controller ID #4 belongs. On the other hand, when the value of T2 is large (T1<T2), the indicator 273 determines to stop all the storage controllers 131 of the storage node (storage node #1) to which the storage controller ID #1 belongs. The control result in a case where the value of T1 is large corresponds to the state illustrated in FIG. 6 described above, and specifically, the storage controllers #2 and #4 (storage controllers 131B and 131D) belonging to the storage node #2 (storage node 130B) are stopped.

Figure 16:
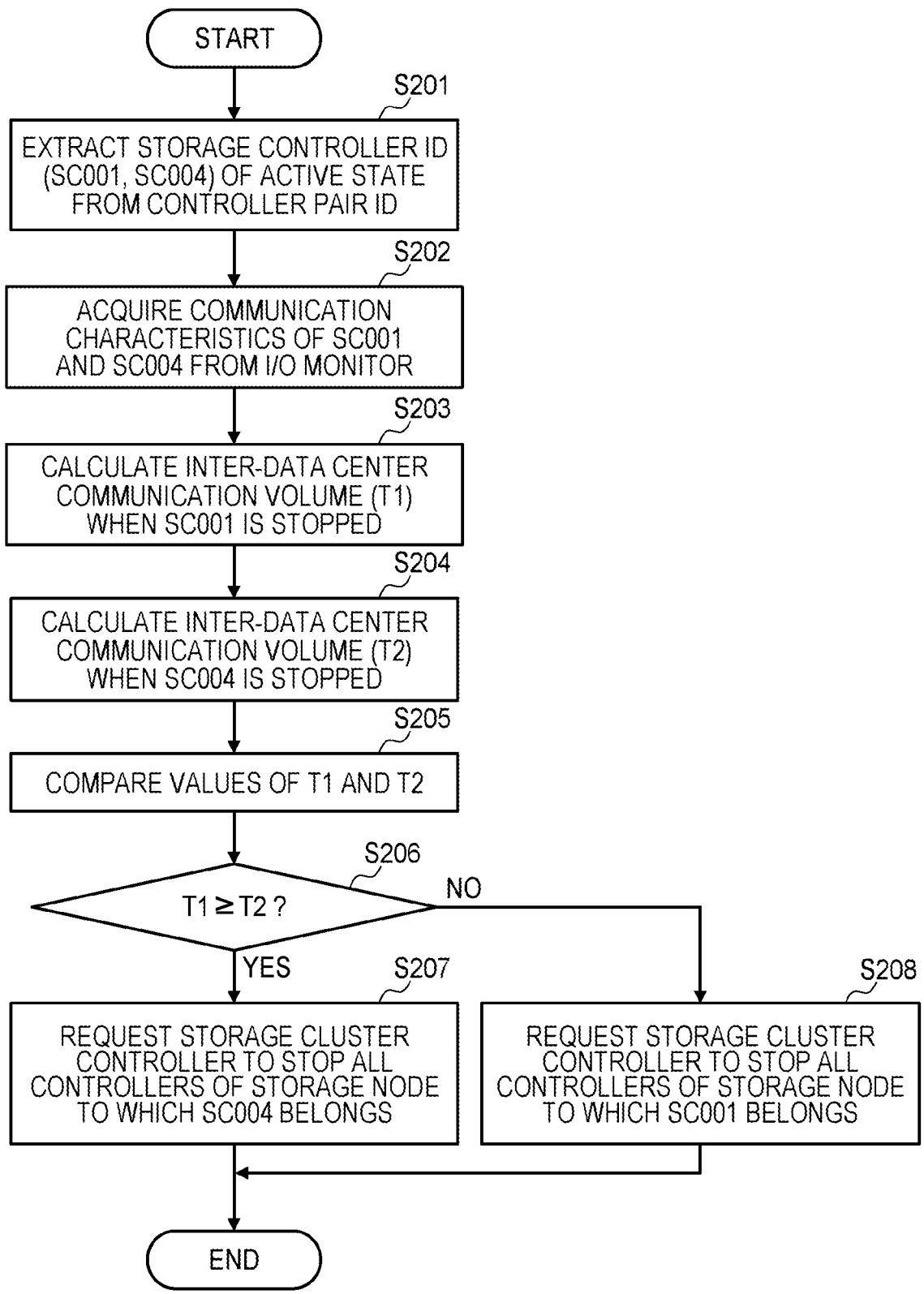
FIG. 16 is a flowchart illustrating a processing procedure example of control method determination processing for a communication failure in the first embodiment.

FIG. 16 is a flowchart illustrating a processing procedure example of control method determination processing for a communication failure in the first embodiment. The control method determination processing illustrated in FIG. 16 is a process executed by the tie breaker 142, and the process is started when the tie breaker 142 receives two controller pair IDs that require failure control from the network monitor 143 that has detected the communication failure between the storage nodes.

According to FIG. 15, first, the collector 271 of the tie breaker 142 extracts the storage controller ID in the active state from the two controller pair IDs received from the network monitor 143 (step S201). In step S201, the collector 271 can extract the storage controller ID in the active state by acquiring the corresponding active storage controller ID 2132 from the controller pair layout table 213 using the received controller pair ID as a key. In the present description, it is assumed that "SC001" is extracted as the storage controller ID #1 corresponding to the storage controller #1, and "SC004" is extracted as the storage controller ID #4 corresponding to the storage controller #4.

Next, the collector 271 inquires of the I/O monitor 132 and acquires information (I/O statistical information 262) of the communication characteristics of the two storage controllers 131 corresponding to the storage controller ID extracted in step S201 (step S202). Then, the collector 271 transmits the acquired I/O statistical information 262 of the two storage controllers 131 (storage controllers ID #1 and #4) to the computers 272A and 272B.

Next, the computer 272A calculates the communication volume "T1" of the inter-data center communication assumed when the storage controller (for example, the storage controller #1) in the active state in the first controller pair is stopped using the I/O statistical information 262 received in step S202 (step S203). The calculation method of "T1" is as described in the description of the computer 272A performed with reference to FIG. 15.

Next, the computer 272B calculates the communication volume "T2" of the inter-data center communication assumed when the storage controller (for example, the storage controller #4) in the active state in the second controller pair is stopped using the I/O statistical information 262 received in step S202 (step S204). The calculation method of "T2" is as described in the description of the computer 272B performed with reference to FIG. 15.

Then, the computer 272A transmits the inter-data center communication volume "T1" calculated in step S203 to the indicator 273, and the computer 272B transmits the inter-data center communication volume "T2" calculated in step S204 to the indicator 273. Note that the execution order of step S203 and step S204 is not particularly limited, and may be performed in parallel.

Next, the indicator 273 compares the calculated value of the inter-data center communication volume "T1" with the value of the inter-data center communication volume "T2" (step S205), and determines whether the value of T1 is equal to or greater than the value of T2 (step S206). If the value of T1 is equal to or greater than the value of T2 (YES in step S206), the process proceeds to step S207, and if the value of T1 is less than the value of T2 (NO in step S206), the process proceeds to step S208.

Here, the relationship of "T1≥T2" means that, in a case where the storage controller #1 in the active state in the first controller pair among the two storage controller pairs is stopped, an inter-data center communication volume generated between the data centers 10 due to the I/O processing is larger than that in a case where the storage controller #4 in the active state in the second controller pair is stopped.

Therefore, in a case where "T1>T2" in step S206 (YES in step S206), the indicator 273 determines to stop all the storage controllers 131 (storage controllers #2 and #4) for the storage node #2 to which the storage controller #4 in the active state in the second controller pair belongs as the control method for reducing the inter-data center communication volume after the failure control (that is, after the storage controller is stopped), requests the storage cluster controller 140 to perform control according to the determination (step S207), and ends the control method determination processing.

On the other hand, the relationship of "T1<T2" means that when the storage controller #4 in the active state in the second controller pair among the two storage controller pairs is stopped, the inter-data center communication volume generated between the data centers 10 due to the I/O processing is larger than that when the storage controller #1 in the active state in the first controller pair is stopped.

Therefore, when "T1<T2" in step S206 (NO in step S206), the indicator 273 determines to stop all the storage controllers 131 (storage controllers #1 and #3) for the storage node #1 to which the storage controller #1 in the active state in the first controller pair belongs as the control method for reducing the inter-data center communication volume after the failure control (that is, after the storage controller is stopped), requests the storage cluster controller 140 to perform control according to the determination (step S208), and ends the control method determination processing.

As described above, by executing the communication characteristics recording processing illustrated in FIG. 14 and the control method determination processing illustrated in FIG. 16, in the computer system 1 according to the present embodiment, in two storage controller pairs (controller pairs #1 and #2 in FIG. 6) which are formed between the storage controllers 131 belonging to the storage nodes 130 of different data centers 10 and in which the storage controllers 131 in the active state in each pair belong to the storage nodes 130 of different data centers 10, when a communication failure occurs between the controller pairs, it is possible to determine a failure control method for stopping all the storage controllers 131 belonging to any one of the storage nodes 130 so as to suppress a communication volume (throughput) between the data centers accompanying the I/O processing to be small. Then, when the storage cluster controller 140 stops the storage controller 131 according to the determined failure control method, the management of the volume 133 by the storage controller 131 in the active state to be stopped is taken over by the storage controller 131 in the standby state of the storage controller pair being in the active state. Then, after the execution of the failure control, the application that has performed the I/O to the stopped storage controller 131 sends the I/O to the storage controller 131 that has taken over the processing. As a result, as described with reference to the conceptual diagram of FIG. 6, the storage system 100 can respond to the I/O request from one or more compute nodes 110 by the storage controller 131 disposed in one data center 10 while suppressing the communication volume of the inter-data center communication via the inter-data center path 152, and failure control to suppress the occurrence of billing and an increase in response due to the I/O processing can be realized.

Meanwhile, in the configuration of the storage system 100 illustrated in FIGS. 1 and 5, one storage node 130 constituting the storage cluster 120 is disposed for each data center 10, but in the storage system 100 according to the present embodiment, the number of storage nodes 130 disposed for each data center 10 is not limited, and a plurality of storage nodes 130 may be disposed in each data center 10. A computer system including the storage system 100 configured as described above will be described as a modification of the first embodiment with reference to FIGS. 17 and 18.

Figure 17:
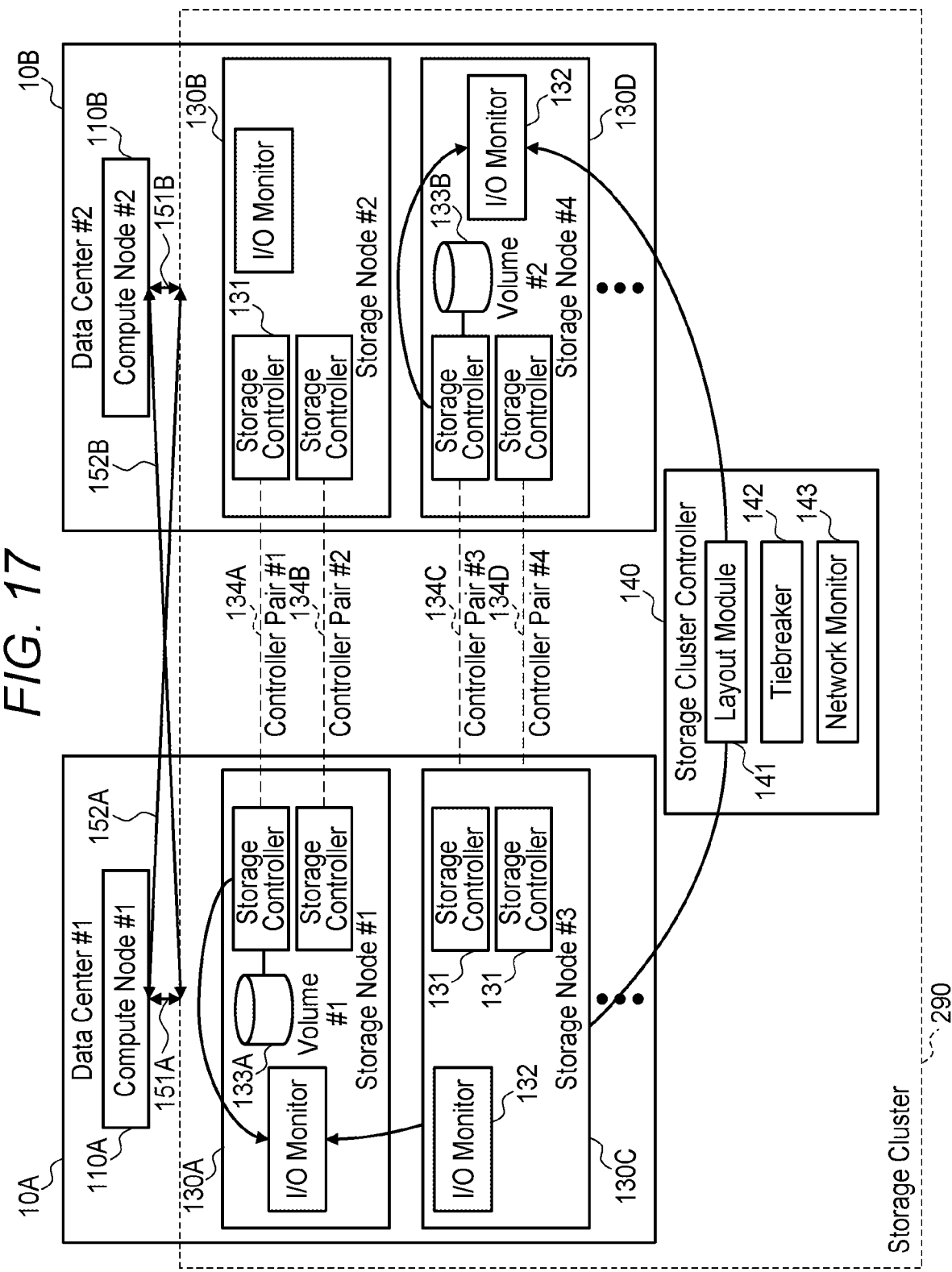
FIG. 17 is a conceptual diagram of a computer system according to a modification of the first embodiment.

FIG. 17 is a conceptual diagram of a computer system according to a modification of the first embodiment. In FIG. 17, a storage cluster 290 is a configuration that may be read as the storage system 100.

As illustrated in FIG. 17, the storage cluster 290 includes a plurality of storage nodes 130 disposed in the data centers 10A and 10B, and one storage cluster controller 140. More specifically, FIG. 17 illustrates a configuration in which at least the storage node 130A (storage node #1) and the storage node 130C (storage node #3) operate in the data center 10A (data center #1), and at least the storage node 130B (storage node #2) and the storage node 130D (storage node #4) operate in the data center 10B (data center #2). Note that more storage nodes 130 may belong to the storage cluster 290 (storage system 100).

In addition, even in a case where a plurality of storage nodes 130 is included in one data center 10 in the storage cluster 290, similarly to the storage cluster 120 illustrated in FIG. 1, the controller pair 134 across different data centers 10 is configured only between specific storage nodes 130. Specifically, in the case of FIG. 17, the storage controller 131 included in the storage node #1 disposed in the data center #1 forms the controller pairs 134A and 134B (controller pairs #1 and #2) with the storage controller 131 included in the storage node #2 disposed in the data center #2, and the storage controller 131 included in the storage node #3 disposed in the data center #1 forms the controller pairs 134C and 134D (controller pairs #3 and #4) with the storage controller 131 included in the storage node #4 disposed in the data center #2.

Figure 18:
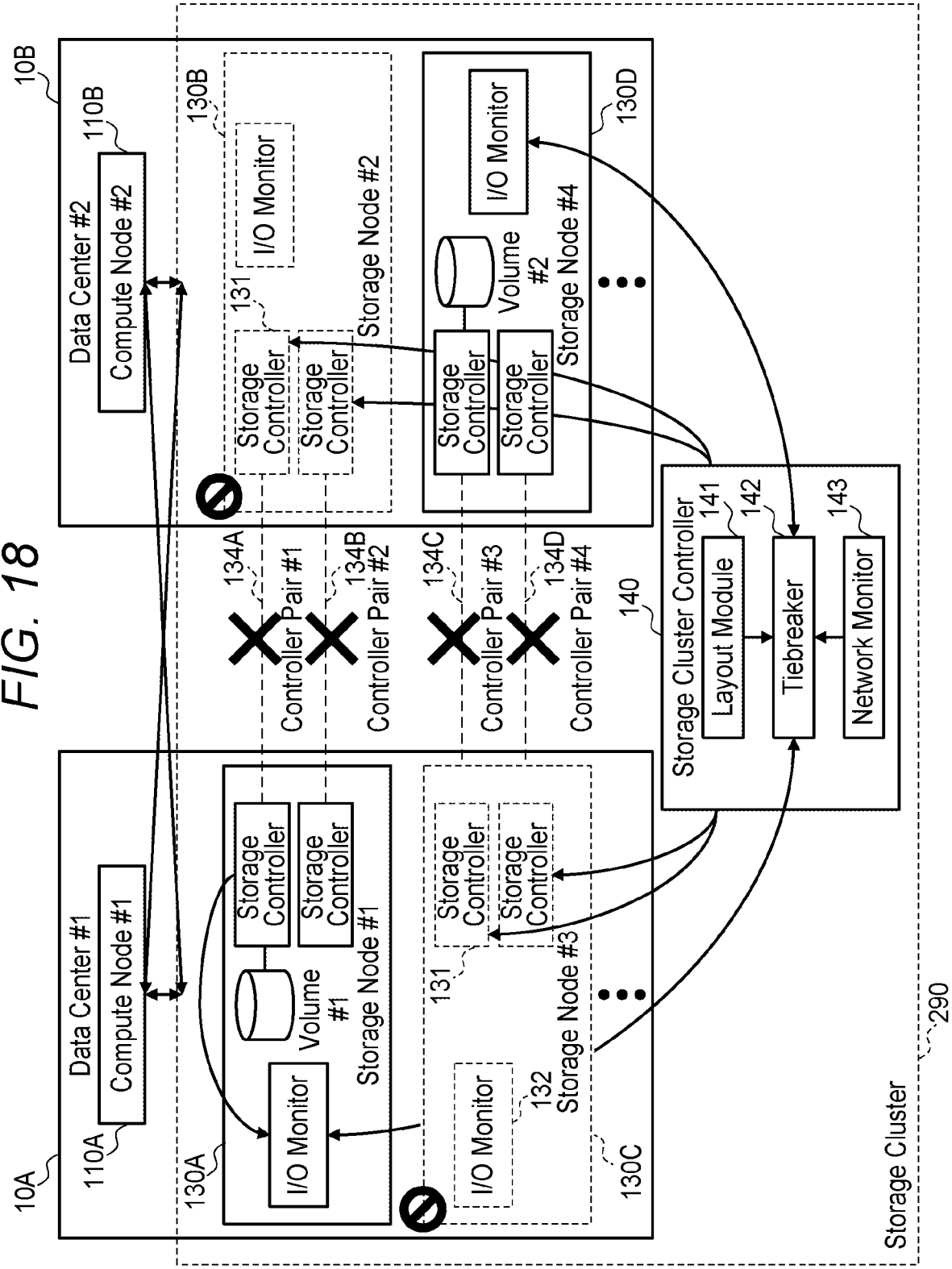
FIG. 18 is a diagram for explaining a communication failure in the storage cluster 290 illustrated in FIG. 17.

FIG. 18 is a diagram for explaining a communication failure in the storage cluster 290 illustrated in FIG. 17. In the storage cluster 290 illustrated in FIG. 18, a failure occurs in the communication path between the storage node #1 and the storage node #2, and the controller pairs #1 and #2 are disconnected. Further, a failure also occurs in a communication path between the storage node #3 and the storage node #4, and the controller pairs #3 and #4 are disconnected.

When a communication failure as illustrated in FIG. 18 occurs, the storage cluster 290 performs failure control in units of two storage nodes forming the controller pair 134. Therefore, in the storage cluster 290, the failure control for the storage node #1 and the storage node #2 and the failure control for the storage node #3 and the storage node #4 can be performed independently. Details of each failure control may be considered to be similar to the failure control described above with reference to FIGS. 15 and 16, and thus description thereof is omitted.

Therefore, even in the configuration of the modification of the first embodiment in which the plurality of storage nodes 130 are disposed in each data center 10, the same effects as those of the storage system 100 of the first embodiment described above can be obtained.

(2) Second Embodiment

In a second embodiment, a storage system 300 including a storage cluster 320 and a quorum disk 330 will be described. In the description of the second embodiment, differences from the first embodiment will be mainly described. Therefore, in the second embodiment, the same components as those in the first embodiment are denoted by the same reference numerals, and the description thereof will be omitted as appropriate. In addition, regarding the processing by the individual configuration, the description of the processing similar to the processing in the first embodiment will be appropriately omitted.

Figure 19:
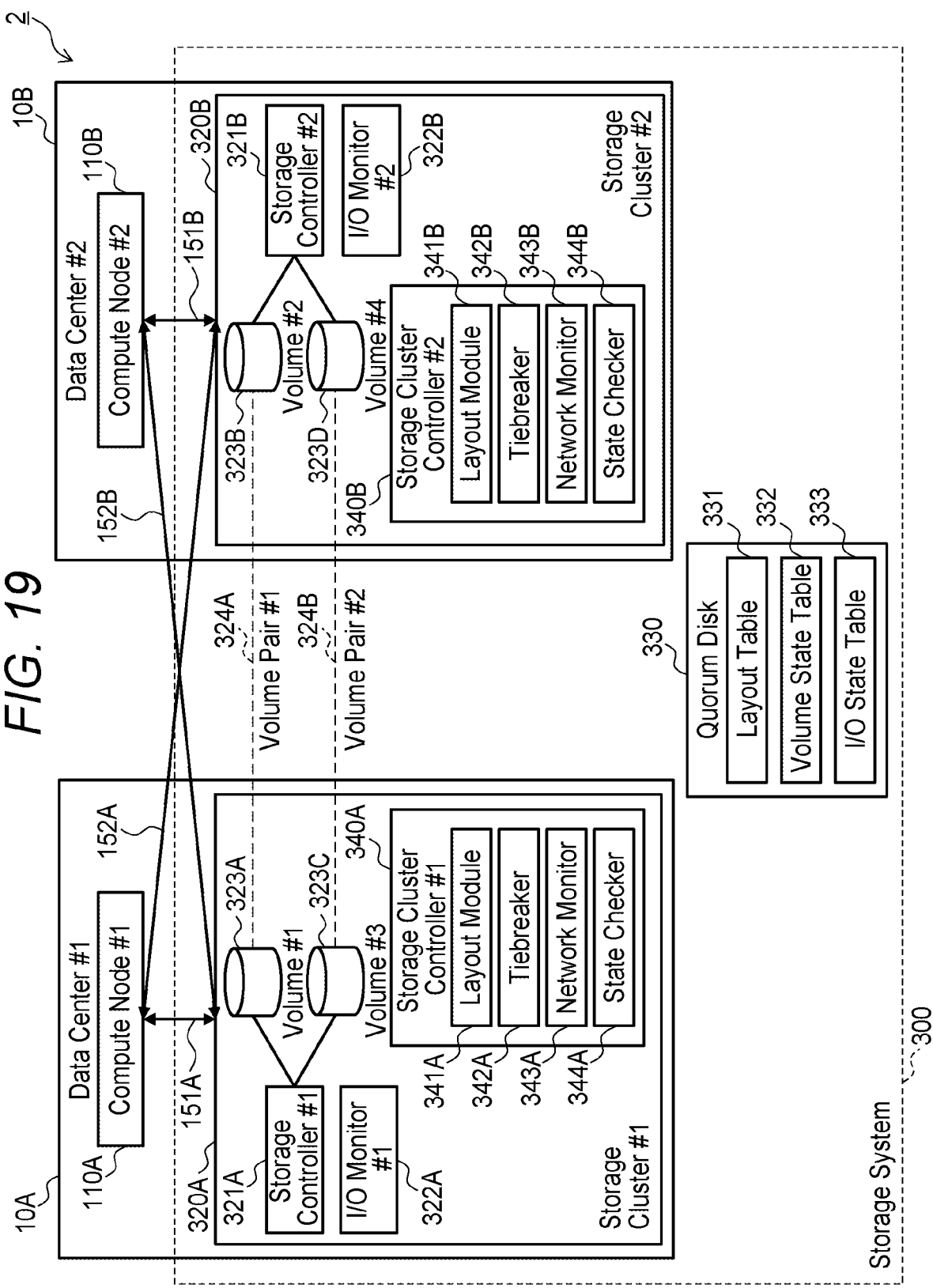
FIG. 19 is a conceptual diagram of a computer system 2 according to a second embodiment of the present invention.

FIG. 19 is a conceptual diagram of a computer system 2 according to the second embodiment of the present invention. The computer system 2 illustrated in FIG. 19 includes the storage system 300 in which a plurality of computers (servers 20) are coupled by a network, and a plurality of computers (compute nodes 110) using the storage system 300.

The storage system 300 includes a storage cluster 320A (storage cluster #1), a storage cluster 320B (storage cluster #2), and a quorum disk 330. Although not illustrated in FIG. 19, each storage cluster 320 may be considered to include one or more storage nodes similarly to the storage clusters 120 and 290 illustrated in the first embodiment.

The storage cluster #1 includes a storage controller 321A (storage controller #1), an I/O monitor 322A (I/O monitor #1), and a storage cluster controller 340A (storage cluster controller #1), and is disposed on the data center 10A (data center #1).

The storage cluster #2 includes a storage controller 321B (storage controller #2), an I/O monitor 322B (I/O monitor #2), and a storage cluster controller 340B (storage cluster controller #2), and is disposed on the data center 10B (data center #2).

The quorum disk 330 is a recording medium having an information recording function accessible from the data center #1 and the data center #2, and includes a layout table 331, a volume state table 332, and an I/O state table 333. Note that the quorum disk 330 may be configured to be held by a node executed on the server 20.

The storage controller #1 manages a volume 323A (volume #1) and a volume 323C (volume #3), and the storage controller #2 manages a volume 323B (volume #2) and a volume 323D (volume #4). In the storage system 300, two volumes 323 disposed in different storage clusters 320 are paired (volume pair 324). The two volumes 323 forming the volume pair 324 hold the same data and operate in an active-active state. Specifically, for example, the volume #1 and the volume #2 form a volume pair 324A (volume pair #1) and hold the same data. I/O access may be performed to either of the volume #1 and the volume #2, and the write results are synchronized between the two volumes. Similarly, the volume #3 and the volume #4 form a volume pair 324B (volume pair #2) and hold the same data.

The storage cluster controller 340 is a controller that is provided for each storage cluster 320 and controls the entire storage cluster 320 to which the storage cluster controller itself belongs. The storage cluster controller #1 includes a layout module 341A, a tie breaker 342A, a network monitor 343A, and a state checker 344A. Similarly, the storage cluster controller #2 includes a layout module 341B, a tie breaker 342B, a network monitor 343B, and a state checker 344B. The state checker 344 has a function of periodically monitoring the volume state table 332 of the quorum disk 330 and, when there is a change in the table, requesting the own storage cluster controller 340 to perform control according to the state.

The compute node 110A (compute node #1) in FIG. 19 is an application that uses the storage system 300, and operates on the data center #1. As illustrated in FIG. 19, the compute node #1 and the storage system 300 are connected by the intra-data center path 151A and the inter-data center path 152A, and access from the compute node #1 to the volume 323 (323A, 323B, 323C, 323D) can be performed via these paths.

The compute node 110B (compute node #2) in FIG. 19 is an application that uses the storage system 300 and operates on the data center #2. As illustrated in FIG. 19, the compute node #2 and the storage system 300 are connected by the intra-data center path 151B and the inter-data center path 152B, and access from the compute node #2 to the volume 323 (323A, 323B, 323C, 323D) can be performed via these paths.

Figure 20:
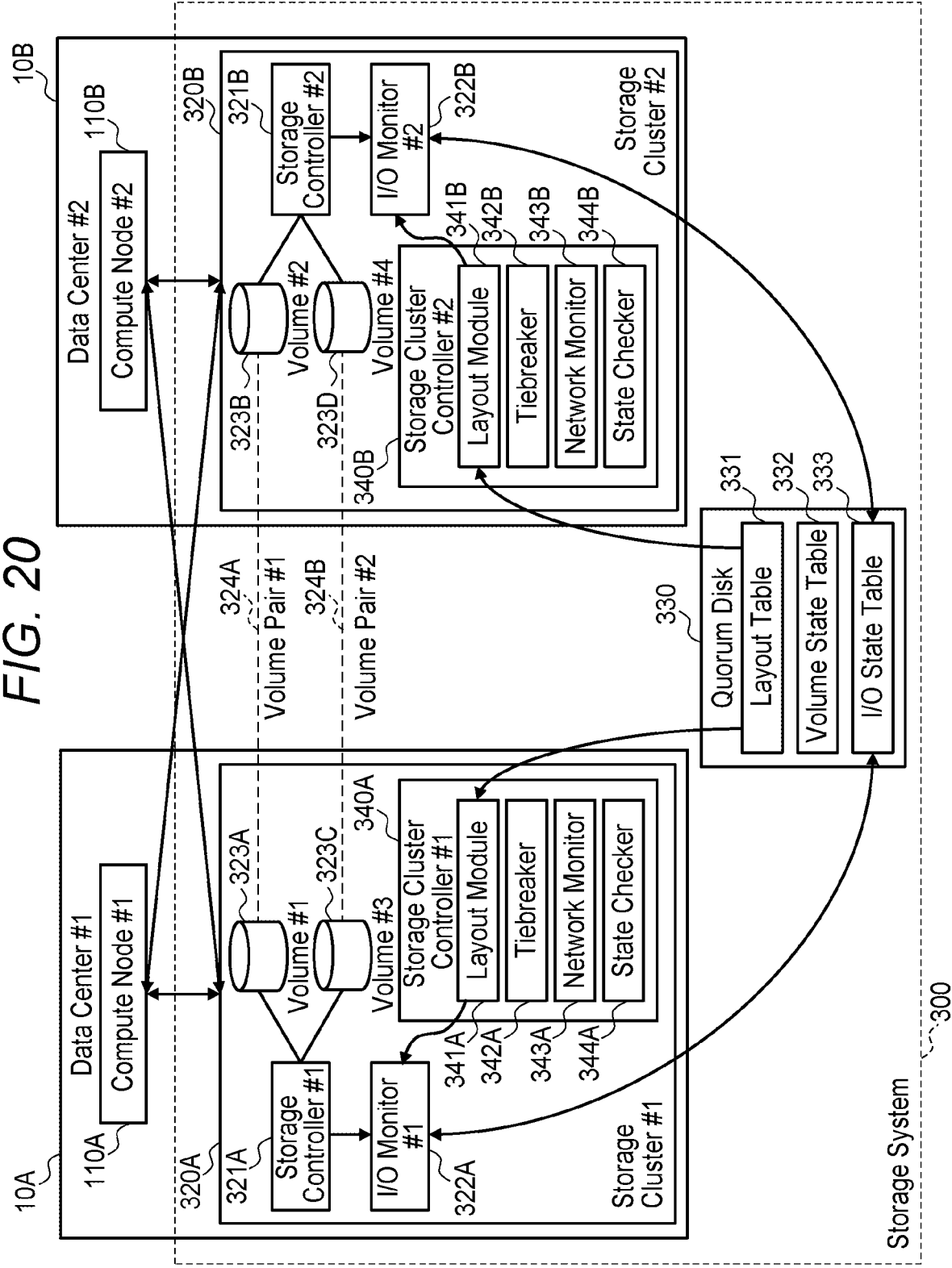
FIG. 20 is a conceptual diagram for explaining collection of I/O log information in the storage system 300.

FIG. 20 is a conceptual diagram for explaining collection of I/O log information in the storage system 300.

As illustrated in FIG. 20, when an I/O arrives from the compute nodes 110A and 110B to the volume 323 (the volume #1 or the volume #3) managed by the storage controller #1 disposed in the data center #1, the storage controller #1 transmits log information of the I/O to the I/O monitor #1.

Then, the I/O monitor #1 uses the received log information of the I/O and the information of the layout module 341A of the storage cluster controller #1 to determine whether the I/O is intra-data center communication or inter-data center communication, and then records the log information of the I/O. Further, the I/O monitor #1 also writes the log information of the recorded I/O in the I/O state table 333. In addition, the I/O monitor #1 periodically monitors the information of the I/O state table 333, and when there is a change, the I/O monitor #1 acquires the difference and records the difference in itself.

On the other hand, as illustrated in FIG. 20, the storage controller #2 disposed in the data center #2 performs the same operation as the storage controller #1 on the storage cluster #2, and the I/O monitor #2 that has received the I/O log information from the storage controller #2 performs the same operation as the I/O monitor #1. Therefore, the I/O monitor #1 and the I/O monitor #2 share the same information via the I/O state table 333.

As illustrated in FIG. 20, the layout module 341A operating on the storage cluster controller #1 has a function of transmitting data center arrangement information of the volume 323 and the compute node 110 to the I/O monitor #1. When the information is changed, the layout module 341A writes the information also in the layout table 331. In addition, the layout module 341A periodically monitors the layout table 331, and when there is a change, acquires and records a difference therebetween.

On the other hand, the layout module 341B operating on the storage cluster controller #2 performs the same operation as the layout module 341A on the storage cluster #2 as illustrated in FIG. 20. Therefore, the layout module 341A of the storage cluster controller #1 and the layout module 341B of the storage cluster controller #2 share the same layout information via the layout table 331.

Figure 21:
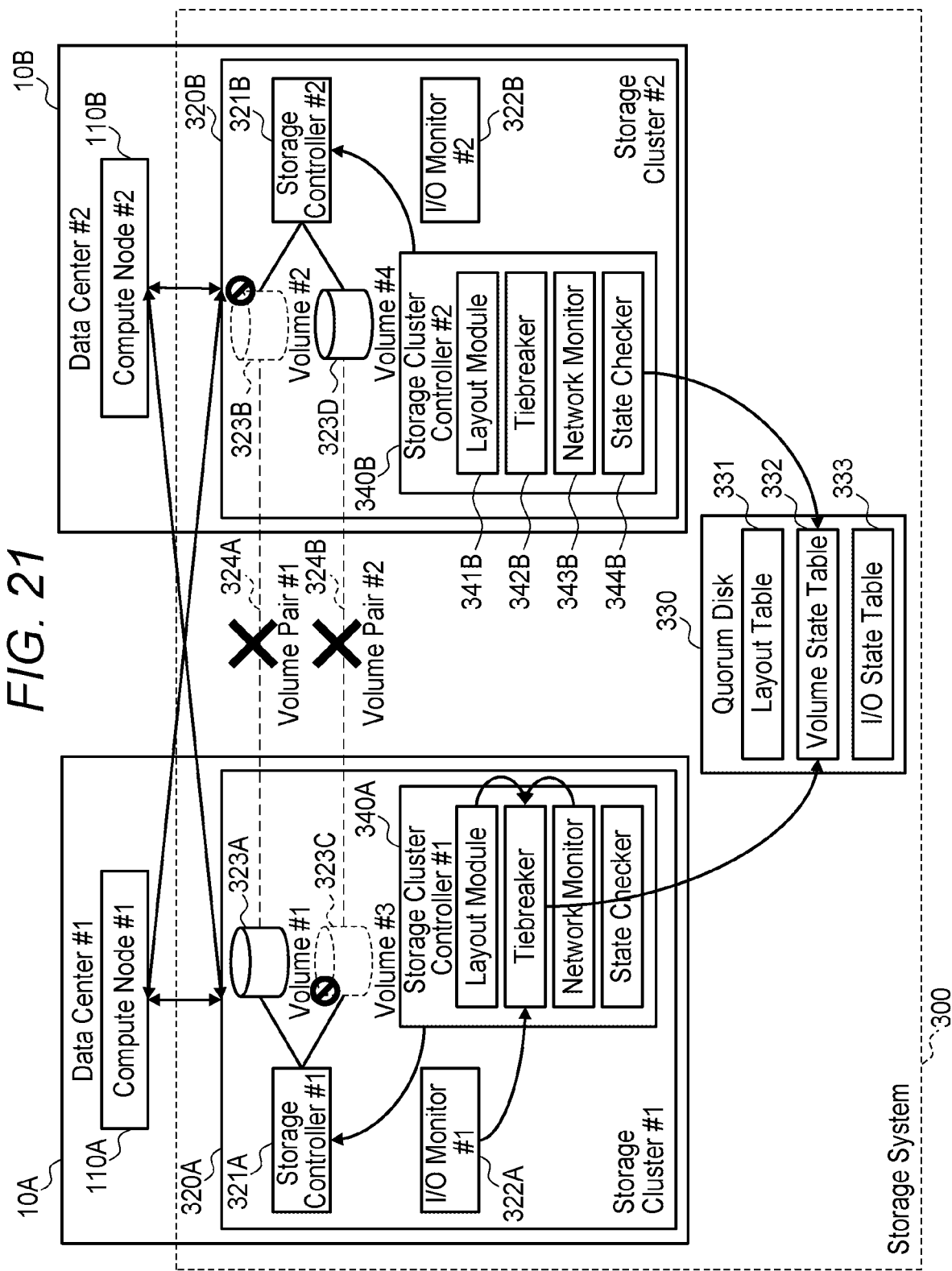
FIG. 21 is a conceptual diagram of communication failure control according to the second embodiment.

FIG. 21 is a conceptual diagram of communication failure control according to the second embodiment. The state of the storage cluster 320 illustrated in FIG. 21 is a state in which the volume pair #1 and the volume pair #2 are disconnected due to a failure in the communication path between the storage node #1 and the storage node #2. In this way, in a case where communication between the volume pairs becomes impossible, synchronization between the volumes cannot be performed. In such a state, the storage system 300 according to the second embodiment stops one volume (for example, the volume #2) for constructing the disconnected volume pair and continues reception of I/O with only the other volume (in this case, the volume #1).

The failure control by the storage system 300 will be specifically described using the above example. When the communication failure occurs as described above, first, the network monitor 343A operating on the storage cluster controller #1 detects that the communication of the volume pair #1 is disabled, and requests the tie breaker 342A to stop the related volume 323.

Next, the tie breaker 342A acquires the configuration information of the storage system 300 from the layout module 341A, and further acquires the I/O statistical information of the volumes #1 and #2 forming the volume pair #1 from the I/O monitor #1.

Then, the tie breaker 342A determines a volume stopping method based on the acquired information such that the inter-data center communication volume (throughput) after stopping any one of the volumes #1 and #2 forming the volume pair #1 is minimized, and requests the storage cluster controller #1 to perform control according to the determined stopping method or writes information according to the determined stopping method to the volume state table 332. For example, in the case of FIG. 21, when stopping the volume #2, the tie breaker 342A determines that the subsequent inter-data center communication volume is minimized, and writes the stop of the volume #2 in the volume state table 332 according to the determination result.

Here, the state checker 344B operating on the storage cluster controller #2 of the storage cluster #2 periodically monitors the volume state table 332, and when there is a change, requests the storage cluster controller #2 to perform control according to the state. Therefore, when the tie breaker 342A writes the stop of the volume #2 in the volume state table 332 as described above, the state checker 344B recognizes this and requests the storage cluster controller #2 to stop the volume #2. Then, the storage cluster controller #2 that has received the request stops the volume #2 via the storage controller #2.

As described above, in the computer system 2 according to the second embodiment, when the volume pair #1 is disconnected due to a communication failure, any of the volumes forming the volume pair #1 can be stopped so that the inter-data center communication volume after the stop is minimized, and reception of I/O can be continued only with the other volume (the volume #1 in this example) that has not been stopped. Note that, even in a case where the volume pair #2 is disconnected due to a communication failure, the reception of I/O can be continued using any one of the volumes forming the volume pair #2 by performing similar processing.

Figure 22:
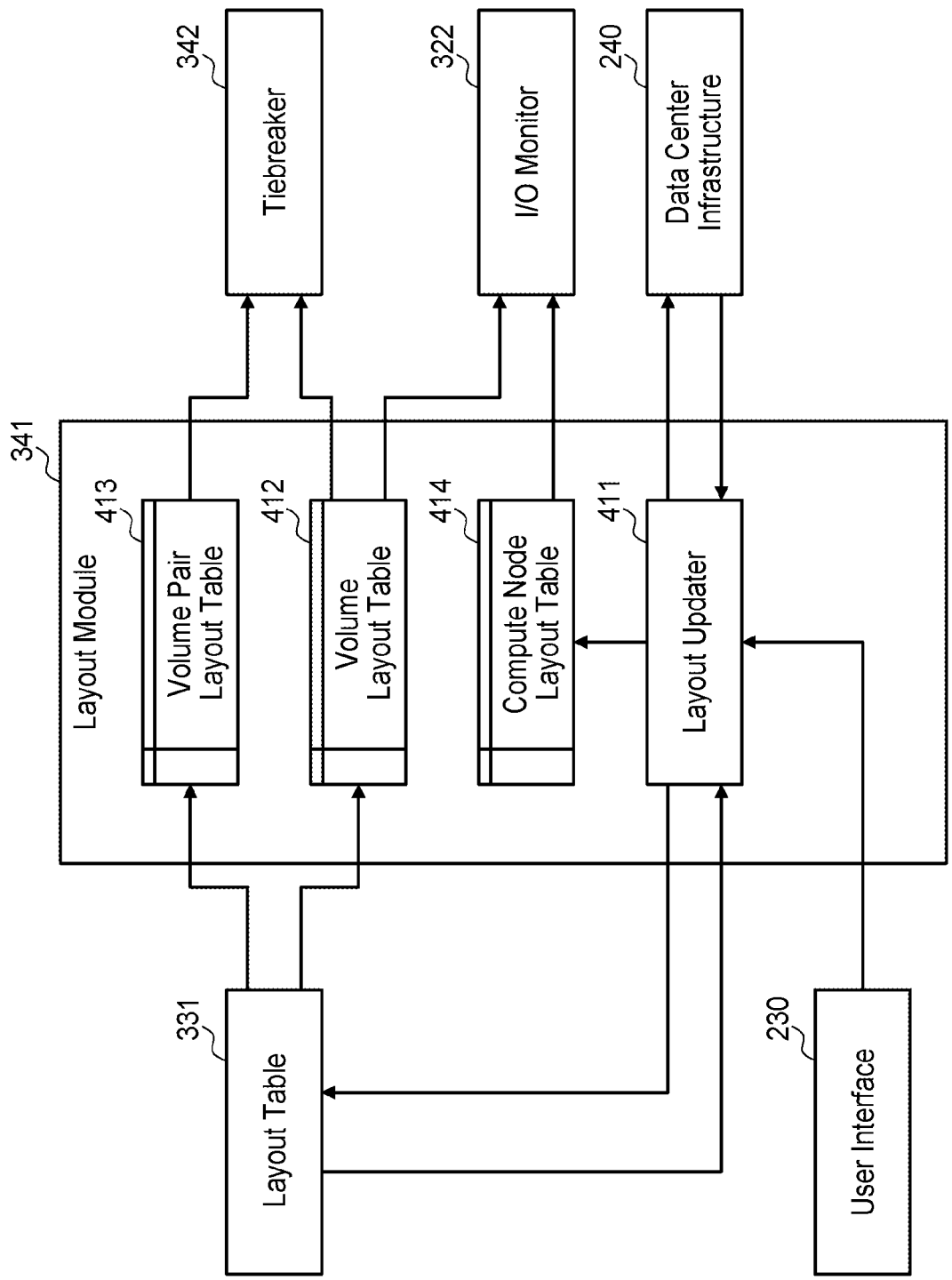
FIG. 22 is a diagram illustrating a configuration example of a layout module 341.

FIG. 22 is a diagram illustrating a configuration example of a layout module 341. As illustrated in FIG. 22, the layout module 341 includes a layout updater 411, a volume layout table 412, a volume pair layout table 413, and a compute node layout table 414.

The volume layout table 412 is data for managing the configuration information of the volume 323, and reads the configuration information of the volume 323 held by the storage system 300 from the layout table 331 and holds the configuration information. When the configuration information of the volume 323 held in the volume layout table 412 is updated, the layout module 341 sends the updated information to the tie breaker 342 and the I/O monitor 322.

FIG. 23 is a diagram illustrating an example of the volume layout table 412. In the case of FIG. 23, the volume layout table 412 includes a data center ID 4121 indicating an identifier (data center ID) allocated to each data center 10, a storage controller ID 4122 indicating an identifier (storage controller ID) allocated to each storage controller 321, and a volume ID 4123 indicating an identifier (volume ID) allocated to a volume managed by the storage controller 321. By referring to such a volume layout table 412, it is possible to know the storage controller 321 and the data center 10 to which the volume 323 belongs.

The volume pair layout table 413 is data for managing information related to the volume pair 324, and reads the configuration information of the volume pair 324 held by the storage system 300 from the layout table 331 and holds the configuration information. When the configuration information of the volume pair 324 held in the volume pair layout table 413 is updated, the layout module 341 transmits the updated information to the tie breaker 342.

FIG. 24 is a diagram illustrating an example of the volume pair layout table 413. In the case of FIG. 24, the volume pair layout table 413 includes a volume pair ID 4131 indicating an identifier (volume pair ID) allocated to each volume pair 324 and a volume ID 4132 indicating a volume ID of the volume 323 forming the volume pair 324. Note that, as described above, in the storage system 300 according to the second embodiment, the two volumes 323 forming the volume pair 324 operate in the active-active state. By referring to such a volume pair layout table 413, the volume 323 forming the volume pair 324 can be known.

The compute node layout table 414 is data for managing arrangement information of the compute nodes 110, and receives the arrangement information of the compute nodes 110 from the layout updater 411 as an input and holds the same. When the arrangement information of the compute nodes 110 held in the compute node layout table 414 is updated, the layout module 341 sends the updated information to the I/O monitor 322. The data configuration of the compute node layout table 414 may be similar to that of the compute node layout table 214 illustrated in FIG. 10, and a detailed description thereof will be omitted.

The layout updater 411 has a function of updating arrangement information of the compute nodes 110 held in the compute node layout table 414. The layout updater 411 may be software or hardware. The layout updater 411 receives inputs of the compute node ID and the instance ID from the user interface 230 on which a user can perform an input operation, inquires of the data center infrastructure 240 about arrangement information of the compute node 110 (information of the data center 10 to which the compute node 110 belongs), and sends processing results thereof to the compute node layout table 414. Further, the layout updater 411 also writes the processing result to the layout table 331. Note that information obtained by the layout updater 411 making an inquiry to the data center infrastructure 240 may be provided from the user interface 230 to the user side. In addition, the layout updater 411 periodically confirms the information of the layout table 331, and reflects the difference in the compute node layout table 414 when there is a change.

Figure 25:
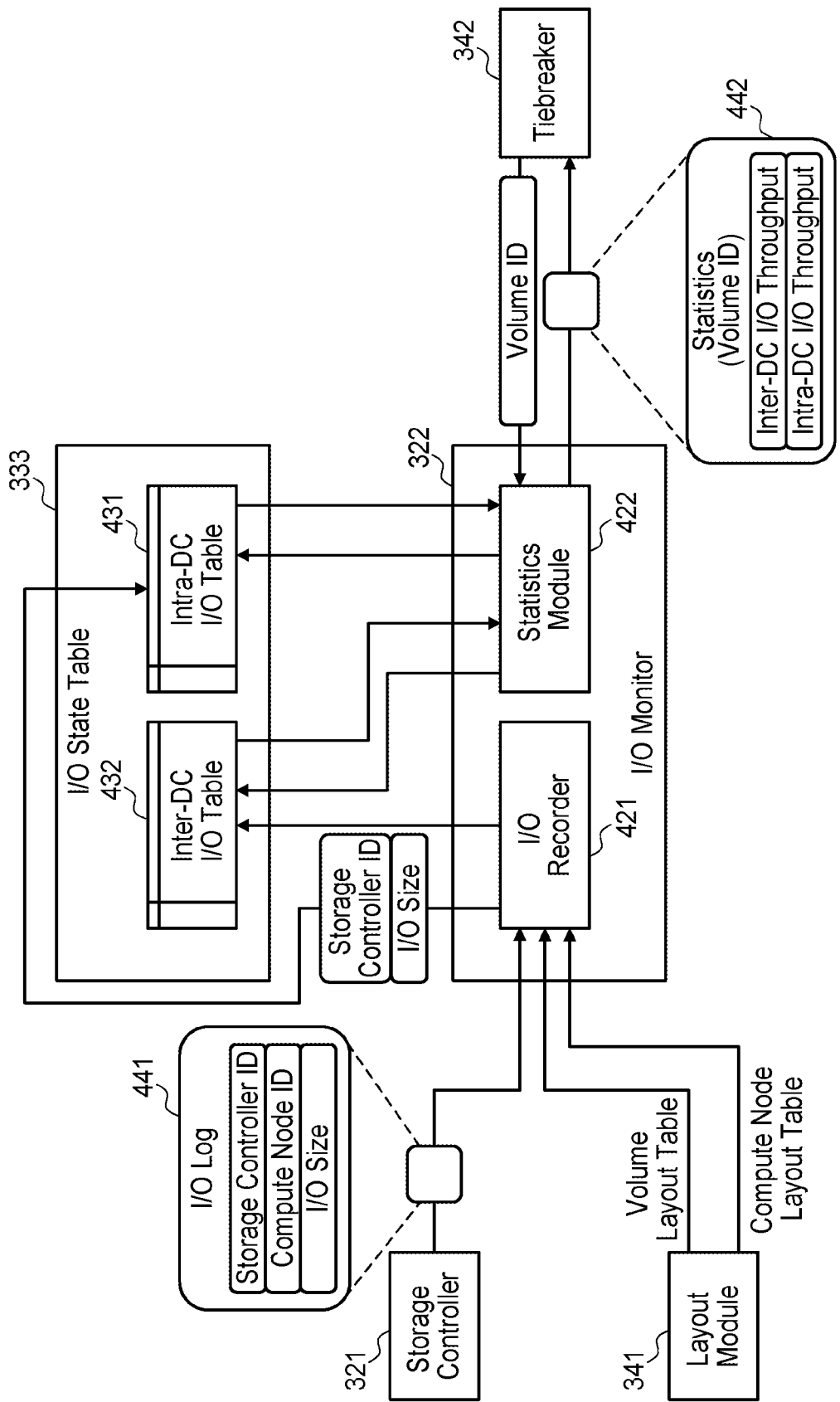
FIG. 25 is a diagram illustrating a configuration example of an I/O monitor 322 and an I/O state table 333.

FIG. 25 is a diagram illustrating a configuration example of the I/O monitor 322 and the I/O state table 333. As illustrated in FIG. 25, the I/O monitor 322 includes an I/O recorder 421 and a statistics module 422, and the I/O state table 333 includes an intra-data center I/O table 431 and an inter-data center I/O table 432.

Figure 27:
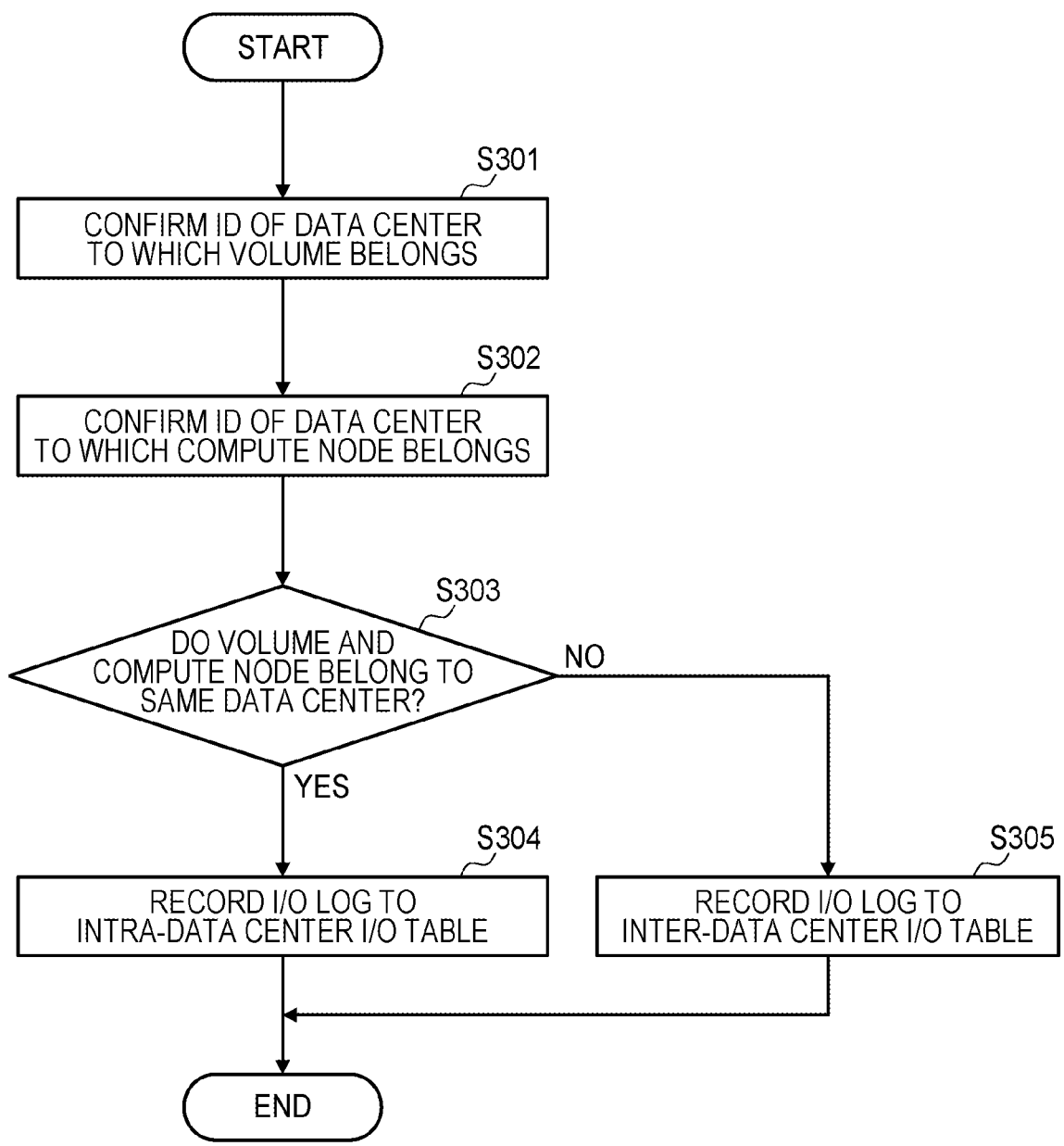
FIG. 27 is a flowchart illustrating a processing procedure example of communication characteristics recording processing in the second embodiment.

The I/O recorder 421 can identify the data center 10 to which the volume 323 and the compute node 110 belong by receiving and holding the information of the volume layout table 412 and the compute node layout table 414 from the layout module 341. Upon receiving the I/O log from the storage controller 321, the I/O recorder 421 uses the volume ID and the compute node ID to identify whether the I/O has been processed through the intra-data center communication or the inter-data center communication. Then, the I/O recorder 421 sends the I/O log to the intra-data center I/O table 431 in the case of the I/O processed through the intra-data center communication, and sends the I/O log to the inter-data center I/O table 432 in the case of the I/O processed through the inter-data center communication. FIG. 27 described later illustrates details of processing (communication characteristics recording processing) by the I/O recorder 421 described above.

Figure 26:
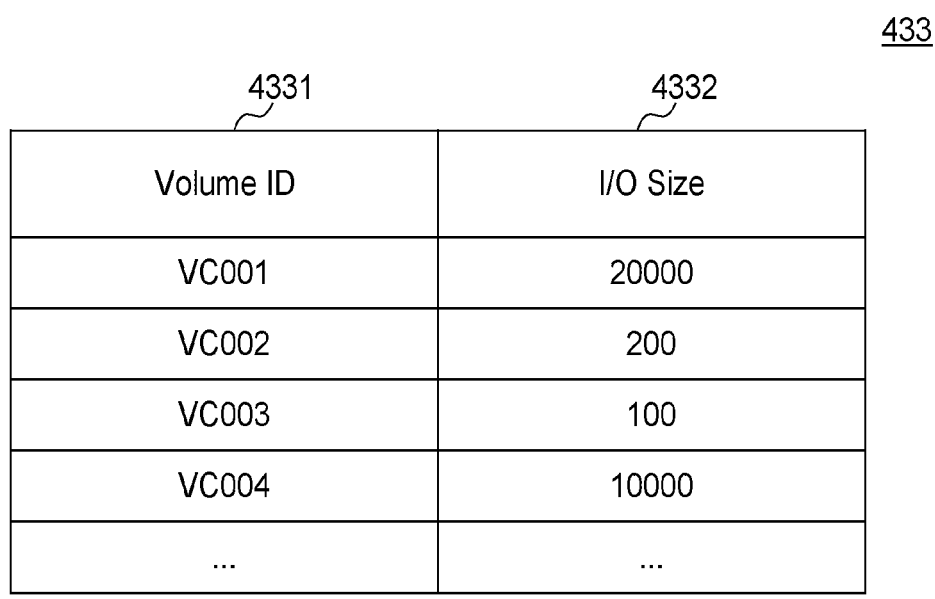
FIG. 26 is a diagram illustrating an example of an I/O information record 433.

The intra-data center I/O table 431 and the inter-data center I/O table 432 increment and hold the processed I/O size for each volume ID (see an I/O information record 433 illustrated in FIG. 26). When the reset signal is received from the statistics module 422, the intra-data center I/O table 431 and the inter-data center I/O table 432 reset the held I/O size to 0.

The statistics module 422 is a program having a function of responding I/O statistical information (I/O communication volume of intra-data center communication and I/O communication volume of inter-data center communication) corresponding to a designated volume ID in response to a request from the tie breaker 342.

More specifically, upon receiving the volume ID from the tie breaker 342, the statistics module 422 reads the I/O size corresponding to the volume ID from the intra-data center I/O table 431 and the inter-data center I/O table 432. Then, the statistics module 422 divides (calculates division) each read I/O size by the elapsed time from the previous reset of each table to convert the read I/O size into the communication volume (throughput) of the intra-data center communication associated with the I/O processing and the communication volume (throughput) of the inter-data center communication associated with the I/O processing, and replies to the tie breaker 342 with the conversion results as statistical information (I/O statistical information 442).

In addition, the statistics module 422 sends a reset signal to the intra-data center I/O table 431 and the inter-data center I/O table 432 at a timing when a reset request is received from the tie breaker 342 or at regular intervals, and causes the I/O size held in each table to be reset to 0. Note that, in a case where a reset request is received from the tie breaker 342 immediately after the I/O size is reset by periodic processing or the like, the I/O size is recorded only for a short time, and there is a possibility that sufficient I/O statistical information for determining a method of stopping the volume 323 to minimize the inter-data center communication volume cannot be obtained. Therefore, in a case where the reset is performed at regular intervals, it is preferable to hold the I/O size before the reset for a predetermined period.

FIG. 26 is a diagram illustrating an example of the I/O information record 433. The I/O information record 433 is data in which I/O log information held in each of the intra-data center I/O table 431 and the inter-data center I/O table 432 is recorded. In the case of FIG. 26, the I/O information record 433 includes a volume ID 4331 indicating a volume ID, and an I/O size 4332 indicating the cumulative total of I/O data amounts in the volume. The I/O information record 433 (intra-data center I/O table 431, inter-data center I/O table 432) increments the processed I/O size in units of the volumes 323 and holds the processed I/O size in the I/O size 4332, and resets the value of the I/O size 4332 to 0 when receiving a reset signal from the statistics module 422.

FIG. 27 is a flowchart illustrating a processing procedure example of communication characteristics recording processing in the second embodiment. The communication characteristics recording processing illustrated in FIG. 27 is a process in which the I/O monitor 322 (particularly, the I/O recorder 421) records the I/O log in the intra-data center I/O table 431 or the inter-data center I/O table 432 as a record of the communication characteristics accompanying the I/O processing for each volume 323 in the storage system 300, and the processing is started when the I/O log is received from the storage controller 321.

According to FIG. 27, first, the I/O monitor 322 confirms the data center ID of the data center 10 to which the volume 323 indicated by the volume ID belongs based on the volume ID included in the I/O log (step S301). When the data center ID is confirmed from the volume ID, the volume layout table 412 illustrated in FIG. 23 may be referred to.

Next, based on the compute node ID included in the I/O log, the I/O monitor 322 confirms the data center ID of the data center 10 to which the compute node 110 indicated by the compute node ID belongs (step S302). When the data center ID is confirmed from the compute node ID, the compute node layout table 414 may be referred to. The execution order of step S301 and step S302 is not particularly limited, and may be processed in parallel.

Next, the I/O monitor 322 compares the data center IDs confirmed in steps S301 and S302, and determines whether the volume 323 indicated in the I/O log and the compute node 110 belong to the same data center 10 (step S303).

When it is determined in step S303 that the volume 323 and the compute node 110 belong to the same data center 10 (YES in step S303), the I/O monitor 322 records the I/O log received at the start of processing in the intra-data center I/O table 431 (step S304), and ends the communication characteristics recording processing.

On the other hand, when it is determined in step S303 that the volume 323 and the compute node 110 belong to different data centers 10 (NO in step S303), the I/O monitor 322 records the I/O log received at the start of processing in the inter-data center I/O table 432 (step S305), and ends the communication characteristics recording processing.

Figure 28:
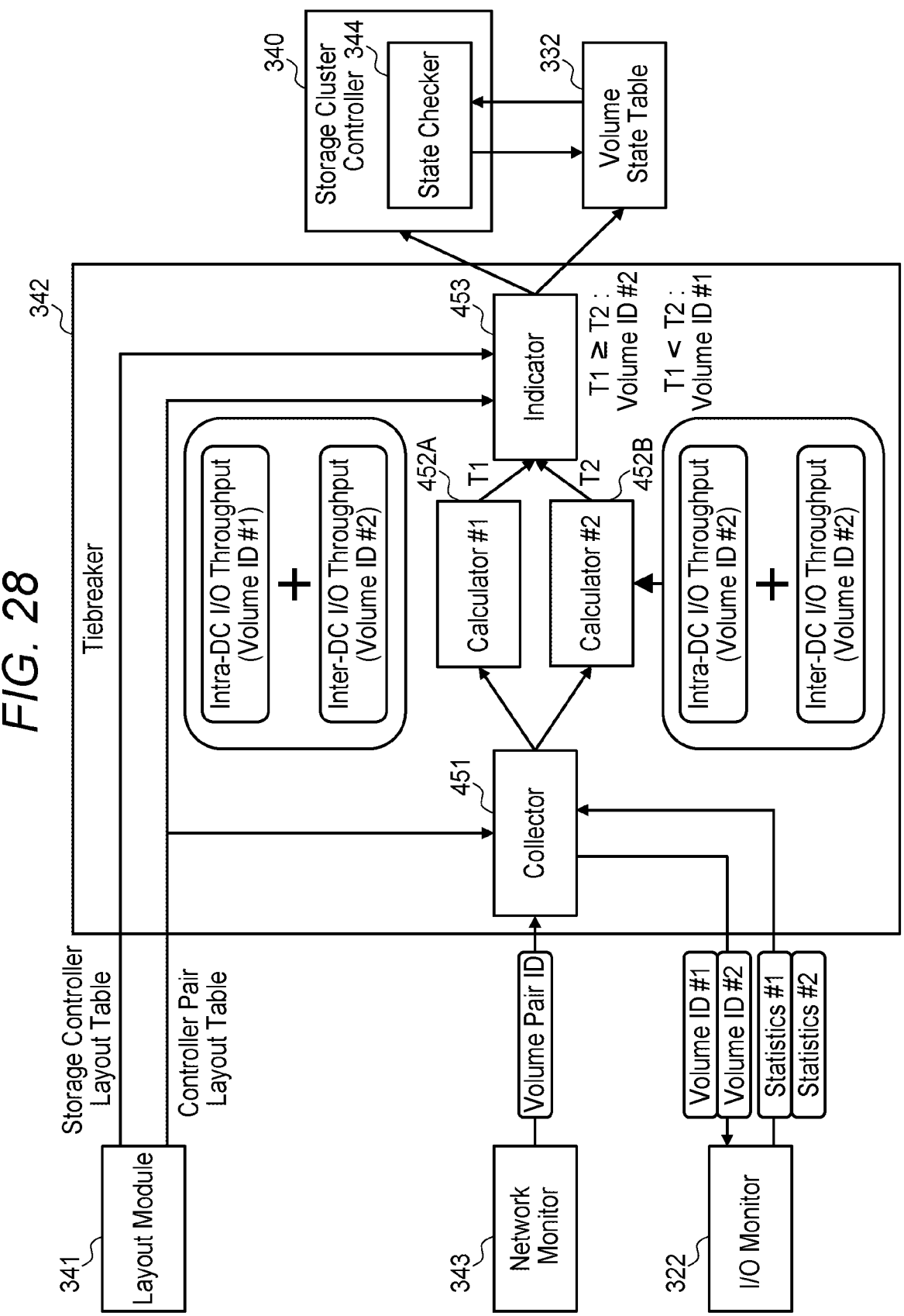
FIG. 28 is a diagram illustrating a configuration example of a tie breaker 342.

FIG. 28 is a diagram illustrating a configuration example of the tie breaker 342. As illustrated in FIG. 28, the tie breaker 342 includes a collector 451, a computer 452 (452A, 452B), and an indicator 453.

The collector 451 has a function of receiving and holding information of the volume pair layout table 413 from the layout module 341, and further has a function of performing the following processing when receiving a volume pair ID that requires failure control from the network monitor 343.

When receiving a volume pair ID that requires failure control from the network monitor 343 that has detected a communication failure between the volume pairs 324, the collector 451 identifies the two volumes 323 forming a pair on the basis of the volume pair ID, and inquires the I/O monitor 322 about the I/O statistical information of each volume 323. Then, when receiving the I/O statistical information (the I/O statistical information 442 illustrated in FIG. 25) inquired from the I/O monitor 322, the collector 451 transmits the information to the computers 452A and 452B.

The computer 452 (452A, 452B) has a function of calculating an inter-data center communication volume (inter-data center I/O throughput) when the volume 323 to be subjected to the failure control stops based on the I/O statistical information, and transmitting the inter-data center communication volume to the indicator 453.

Specifically, in the case of FIG. 28, the computer 452A refers to the I/O statistical information and adds the I/O throughput of the intra-data center communication for the volume ID #1 and the I/O throughput of the inter-data center communication for the volume ID #2 in order to calculate the inter-data center communication volume ("T1" in FIG. 28) when the first volume (in this example, the volume #1) forming the volume pair is stopped. In addition, the computer 452B refers to the I/O statistical information and adds the I/O throughput of the intra-data center communication for the volume ID #2 and the I/O throughput of the inter-data center communication for the volume ID #1 in order to calculate the inter-data center communication volume ("T2" in FIG. 28) when the second volume (in this example, the volume #2) forming the volume pair stops.

The indicator 453 has a function of receiving and holding the information of the volume layout table 412 and the volume pair layout table 413 from the layout module 341, and further has a function of performing the following processing when receiving the calculation result (T1 and T2 in FIG. 28) of the throughput between the data centers in a case where one of the volumes forming the volume pair is stopped from the computers 452A and 452B.

Figure 30:
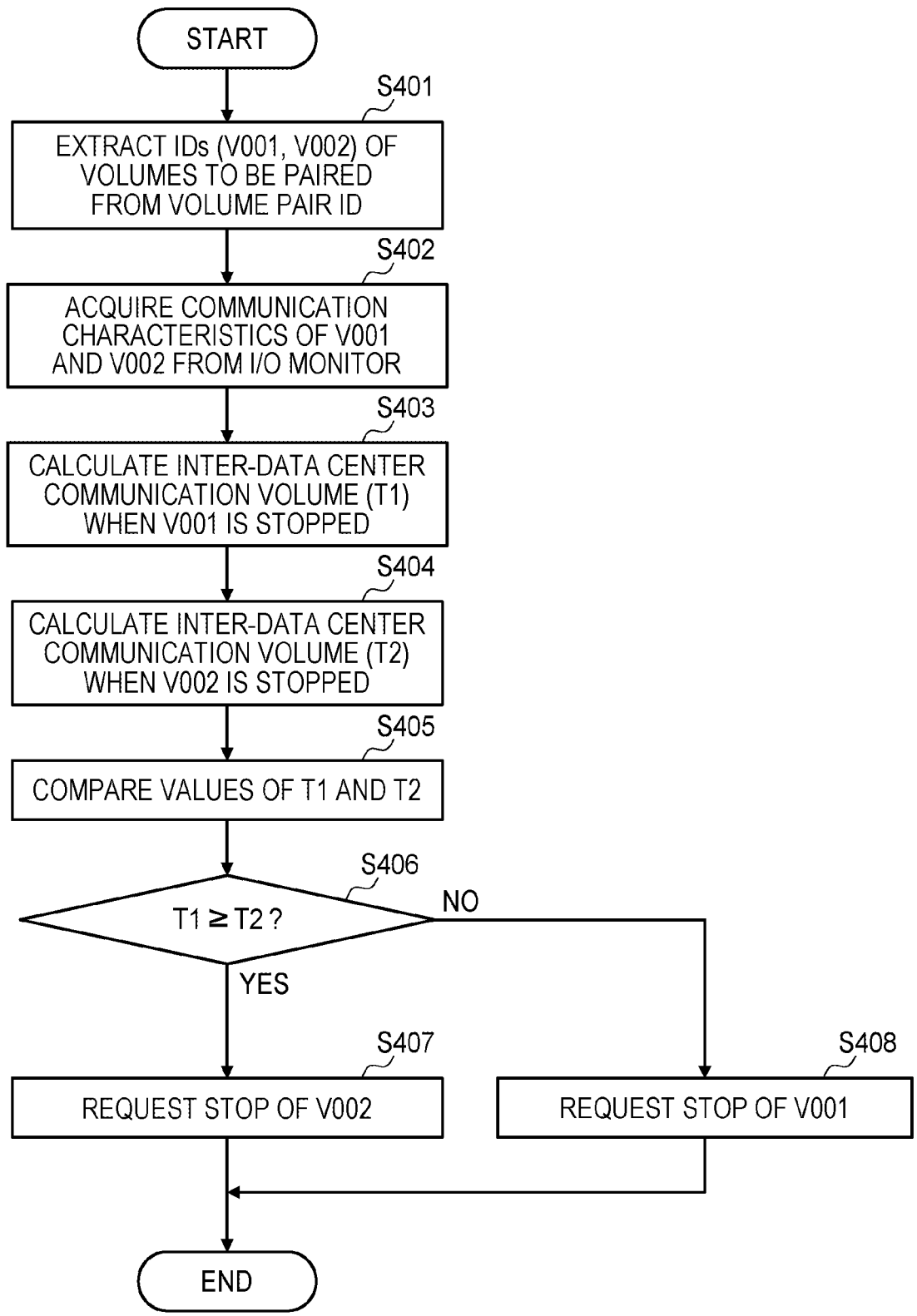
FIG. 30 is a flowchart illustrating a processing procedure example of control method determination processing for a communication failure in the second embodiment.

The indicator 453 compares the inter-data center communication volume (inter-data center I/O throughput) T1 received from the computer 452A with the inter-data center communication volume (inter-data center I/O throughput) T2 received from the computer 452B, determines to stop the volume 323 so that the inter-data center communication volume (throughput) decreases, and requests the storage cluster controller 340 to stop the target volume 323 according to the determination result (for details, refer to FIG. 30 described later). Further, the indicator 453 writes that the target volume 323 is set to the stopped state in the volume state table 332.

Figure 29:
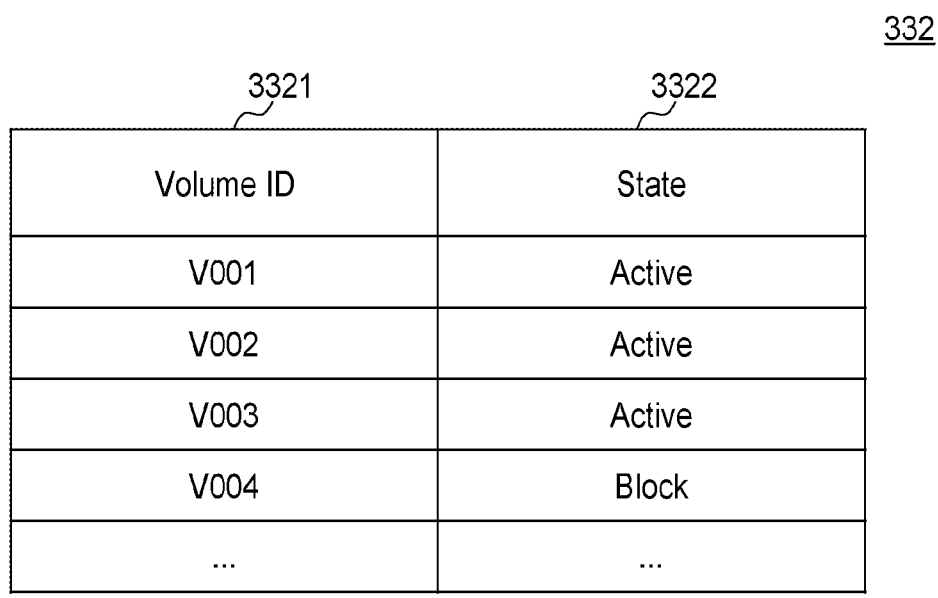
FIG. 29 is a diagram illustrating an example of a volume state table 332.

FIG. 29 is a diagram illustrating an example of the volume state table 332. The volume state table 332 is a table that holds state information for each volume 323, and includes a volume ID 3321 indicating a volume ID and a state 3322 indicating a state of the volume in the case of FIG. 29. In state 3322, the state of the volume is indicated by an active state ("Active") or a block state ("Block"). The active state indicates that the volume 323 is in an I/O enabled state, and the block state indicates that the volume 323 is in an I/O disabled state.

FIG. 30 is a flowchart illustrating a processing procedure example of control method determination processing for a communication failure in the second embodiment. The control method determination processing illustrated in FIG. 30 is processing executed by the tie breaker 342, and the processing is started when the tie breaker 342 receives a volume pair ID that requires failure control from the network monitor 343 that has detected a communication failure between volumes.

According to FIG. 30, first, the collector 451 of the tie breaker 342 extracts the volume IDs of the two paired volumes 323 based on the volume pair ID received from the network monitor 343 (step S401). In step S401, the collector 451 can extract the volume IDs of the two volumes 323 to be paired by acquiring the corresponding volume ID 4132 from the volume pair layout table 413 using the received volume pair ID as a key. In this description, as a specific example using FIG. 28 and the like, it is assumed that the volume ID #1 "V001" and the volume ID #2 "V002" are extracted based on the reception of the volume pair ID #1.

Next, the collector 451 makes an inquiry to the I/O monitor 322, and acquires information (I/O statistical information 442) on the communication characteristics of the two volumes 323 corresponding to the volume ID extracted in step S401 (step S402). Then, the collector 451 transmits the acquired I/O statistical information 442 of the two volumes 323 (volumes #1 and #2) to the computers 452A and 452B.

Next, the computer 452A calculates the communication volume "T1" of the inter-data center communication assumed when the first volume 323 (for example, the volume #1) in the volume pair 324 in which the communication failure is detected stops using the I/O statistical information 442 received in step S402 (step S403). The calculation method of "T1" is as described in the description of the computer 452A performed with reference to FIG. 28.

Next, the computer 452B calculates the communication volume "T2" of the inter-data center communication assumed when the first volume 323 (for example, the volume #2) in the volume pair 324 in which the communication failure is detected stops using the I/O statistical information 442 received in step S402 (step S404). The calculation method of "T2" is as described in the description of the computer 452B performed with reference to FIG. 28.

Then, the computer 452A transmits the inter-data center communication volume "T1" calculated in step S403 to the indicator 453, and the computer 452B transmits the inter-data center communication volume "T2" calculated in step S404 to the indicator 453. Note that the execution order of step S403 and step S404 is not particularly limited, and may be performed in parallel.

Next, the indicator 453 compares the calculated value of the inter-data center communication volume "T1" with the value of the inter-data center communication volume "T2" (step S405), and determines whether the value of T1 is equal to or greater than the value of T2 (step S406). If the value of T1 is equal to or greater than the value of T2 (YES in step S406), the process proceeds to step S407, and if the value of T1 is less than the value of T2 (NO in step S406), the process proceeds to step S408.

Here, the relationship of "T1>T2" means that when the first volume #1 of the two volumes #1 and #2 forming the volume pair #1 is stopped, the inter-data center communication volume generated between the data centers 10 due to the I/O processing becomes larger than when the second volume #2 is stopped.

Therefore, in a case where "T1≥T2" is satisfied in step S406 (YES in step S406), the indicator 453 determines to stop the second volume #2 as the control method for reducing the inter-data center communication volume after the failure control (after the volume stop), requests the storage cluster controller 340 to perform control in accordance with this determination (alternatively, writing that the volume #2 (volume ID "V002") is brought into a stopped state in the volume state table 332) (step S407), and ends the control method determination processing.

On the other hand, the relationship of "T1<T2" means that when the second volume #2 of the two volumes #1 and #2 forming the volume pair #1 is stopped, the inter-data center communication volume generated between the data centers 10 due to the I/O processing is larger than that when the first volume #1 is stopped.

Therefore, in a case where "T1<T2" in step S406 (NO in step S406), the indicator 453 determines to stop the first volume #1 as a control method for reducing the inter-data center communication volume after the failure control (after the volume stop), requests the storage cluster controller 340 to perform control in accordance with this determination (alternatively, writing that the volume #2 (volume ID "V002") is brought into a stopped state in the volume state table 332) (step S408), and ends the control method determination processing.

As described above, in the computer system 2 according to the second embodiment, the communication characteristics recording processing illustrated in FIG. 27 and the control method determination processing illustrated in FIG. 30 are executed, and thus, it is possible to determine the failure control method for stopping one of the two volumes 323 forming the volume pair 324 so as to suppress the communication volume (throughput) between the data centers associated with the I/O processing to be small when the communication failure between the volume pairs occurs in the volume pair 324 formed between the volumes 323 in the storage cluster 310 of different data centers 10. Here, since the two volumes 323 forming the volume pair 324 operate in synchronization with data in the active-active state, even after the storage cluster controller 340 stops one volume 323 according to the determined failure control method, the other volume 323 can accept the I/O access. As a result, as described with reference to the conceptual diagram of FIG. 21, the storage system 300 can respond to the I/O requests from one or more compute nodes 110 with the volume 323 that has not been stopped while suppressing the communication volume of the inter-data center communication via the inter-data center path 152, and can implement failure control that suppresses the occurrence of billing and an increase in response due to the I/O processing.

(3) Third Embodiment

A third embodiment is an embodiment obtained by extending the first embodiment, and a function of proposing a method of arranging the compute nodes 110 capable of further reducing the inter-data center communication volume in a state after the storage controller is stopped by the communication failure control is added. In the following description, a configuration unique to the third embodiment will be mainly described based on the configuration according to the first embodiment.

Figure 31:
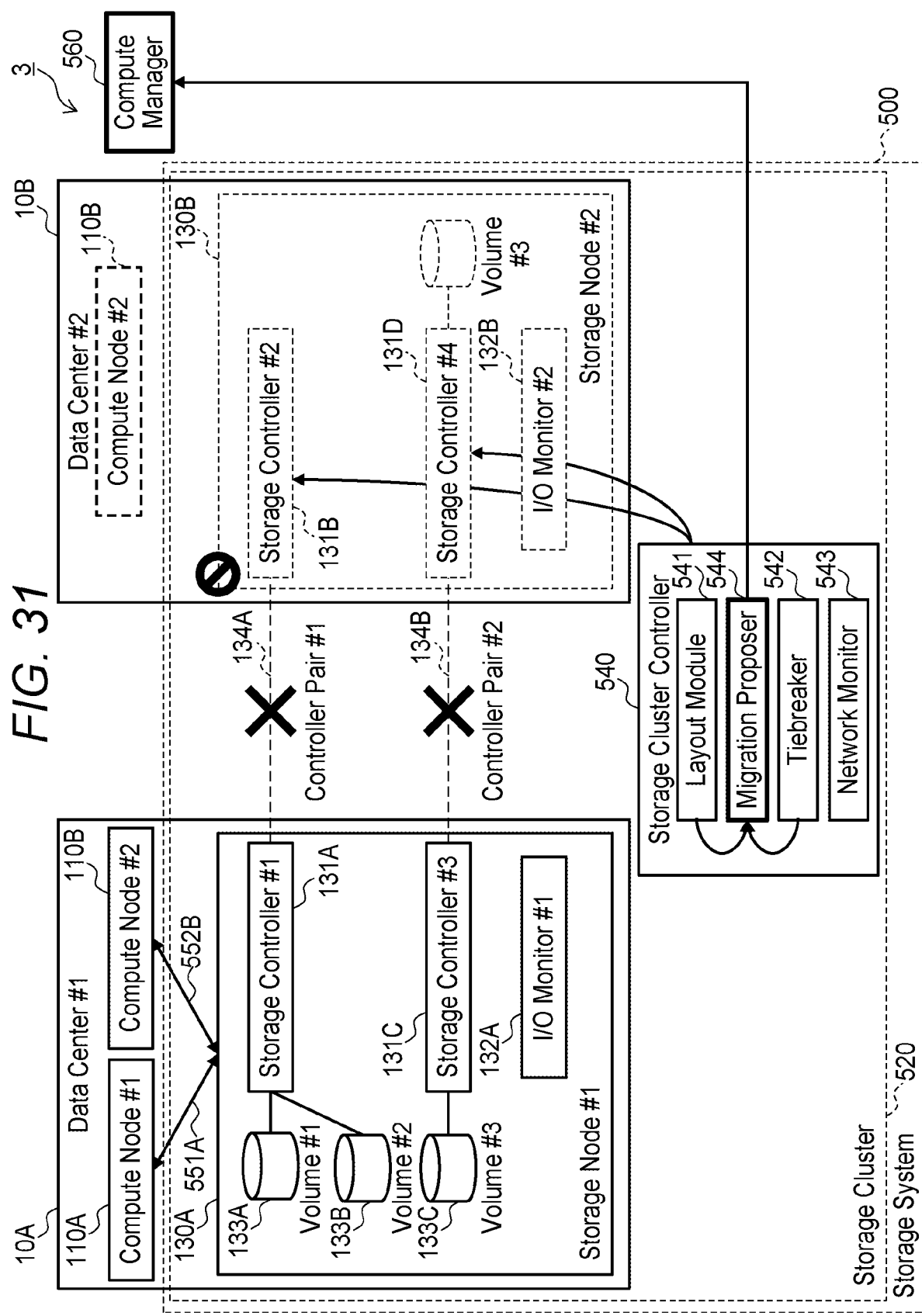
FIG. 31 is a conceptual diagram of a computer system 3 according to a third embodiment of the present invention.

FIG. 31 is a conceptual diagram of a computer system 3 according to the third embodiment of the present invention. FIG. 31 also illustrates an image of communication failure control in the third embodiment.

As illustrated in FIG. 31, a storage system 500 (storage cluster 520) included in the computer system 3 includes a storage cluster controller 540 having an internal configuration different from that of the storage cluster controller 140 as a difference from the configuration of the storage system 100 (storage cluster 120) in the first embodiment illustrated in FIG. 1. In addition, a compute manager 560 is added to the computer system 3 as a difference from the computer system 1 according to the first embodiment.

The storage cluster controller 540 according to the third embodiment includes a layout module 541, a tie breaker 542, a network monitor 543, and a migration proposer 544. Among them, the configuration other than the migration proposer 544 is similar to the configuration of the storage cluster controller 140 of the first embodiment having the same name, but is different from the first embodiment in a part of the processing by the tie breaker 542. Details of the storage cluster controller 540 will be described below.

When a communication failure occurs in the controller pair 134, the tie breaker 542 determines a method for stopping the storage controller 131 similarly to the tie breaker 142 in the first embodiment, and requests the storage cluster controller 540 to perform control to stop the determined storage controller 131. At this time, the tie breaker 542 also passes the ID of the storage controller in the active state to be stopped to the migration proposer 544.

Specifically, in the case of FIG. 31, the tie breaker 542 determines to stop the storage controller #2 and the storage controller #4 belonging to the storage node #2, and passes the storage controller ID "SC004" of the storage controller #4 in the active state to the migration proposer 544.

The migration proposer 544 has a function of proposing a method of disposing the compute nodes 110 that can be expected to further reduce the inter-data center communication volume in a state after the predetermined storage controller 131 is stopped. Upon receiving the storage controller ID from the tie breaker 542, the migration proposer 544 acquires the configuration information of the storage system 500 and the arrangement information of the compute nodes 110 from the layout module 541. Then, the migration proposer 544 calculates an arrangement method of the compute nodes 110 expected to reduce the inter-data center communication volume in a state after the storage controller 131 is stopped by the failure control on the basis of the acquired information, and proposes the arrangement method to the compute manager 560.

The compute manager 560 is a mechanism that controls the arrangement and operation of the compute nodes 110. Upon receiving a proposal for a compute node arrangement method from the migration proposer 544, the compute manager 560 determines whether to implement the proposal. The determination may be performed on the basis of a program prepared in advance, or the determination by the user may be received. Then, in a case where it is determined to implement the proposal, the compute manager 560 changes the arrangement of the compute nodes 110 according to the content of the proposal.

Specifically, in the case of FIG. 31, the compute manager 560 controls the compute node #1 (compute node 110A) and the compute node #2 (compute node 110B). In a state before the communication failure occurs and the failure control is performed, the compute node #1 is disposed in the data center 10A, and the compute node #2 is disposed in the data center #2. Thereafter, after the storage controllers #2 and #4 in the data center #2 are stopped by the failure control, the migration proposer 544 proposes arranging the compute node #2 in the data center #1 as an arrangement method for further reducing the inter-data center communication volume. In response to this proposal, the compute manager 560 moves the compute node #2 disposed in the data center #2 to the data center #1.

As a result of the placement control of the compute nodes 110 performed by the compute manager 560 as described above, the compute nodes #1 and #2 are placed in the data center #1. In such a state, in the storage system 500, as illustrated in FIG. 31, the paths of the compute nodes #1 and #2 with respect to the storage cluster 520 (storage system 500) are only the intra-data center paths 551A and 551B in the data center #1, and the inter-data center communication can be made 0.

Figure 32:
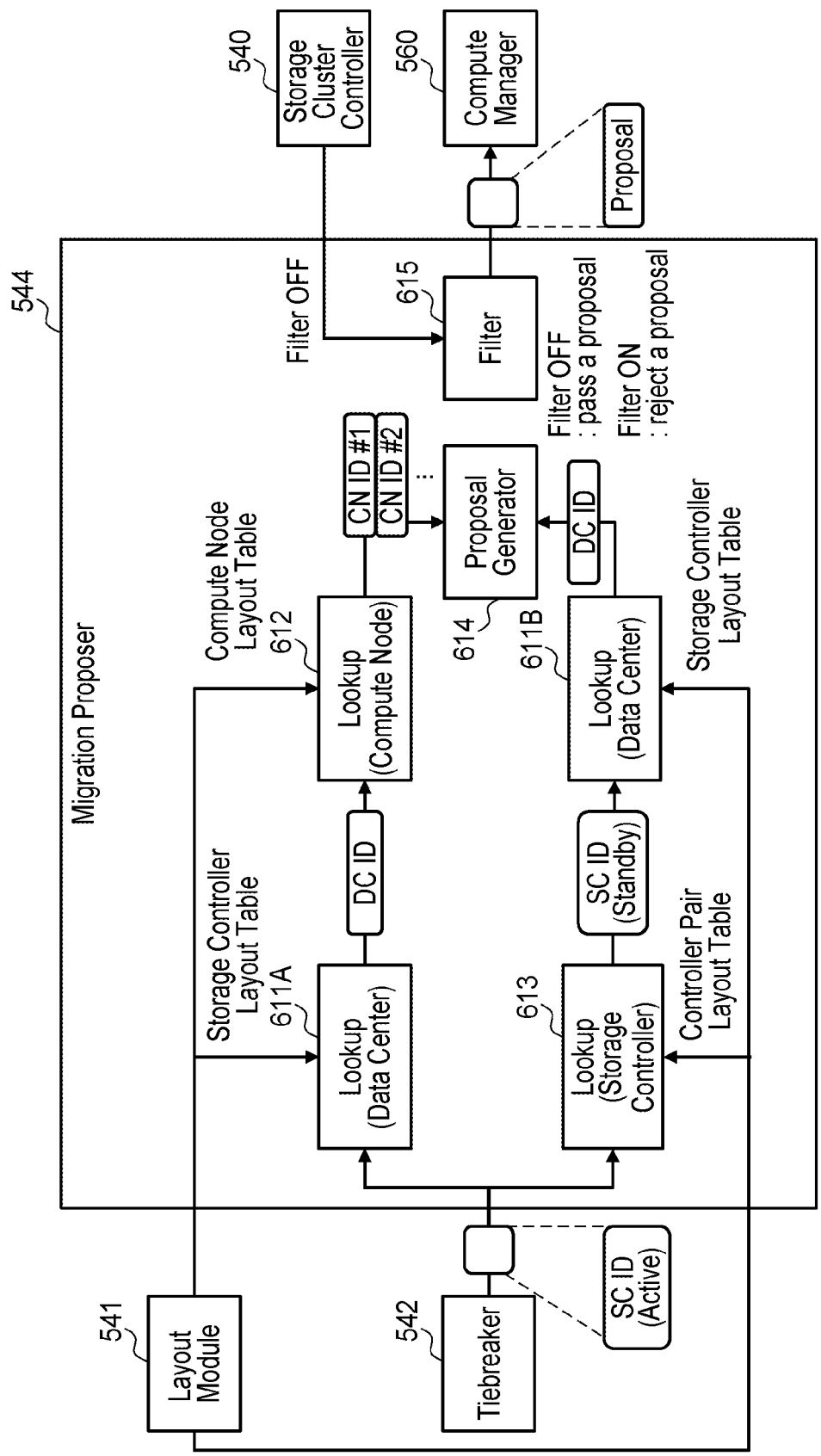
FIG. 32 is a diagram illustrating a configuration example of a migration proposer 544.

FIG. 32 is a diagram illustrating a configuration example of the migration proposer 544. As illustrated in FIG. 32, the migration proposer 544 includes a data center searcher 611 (individually, a data center searcher 611A and a data center searcher 611B), a compute node searcher 612, a storage controller searcher 613, a proposal generator 614, and a filter 615.

The data center searcher 611 receives and holds information of the storage controller layout table from the layout module 541. The internal configuration of the layout module 541 may be considered to be similar to that of the layout module 141 illustrated in FIG. 7 in the first embodiment, and includes a layout updater 211, a storage controller layout table 212, a controller pair layout table 213, and a compute node layout table 214 therein. Therefore, the information on the storage controller layout table received by the data center searcher 611 may be considered as the information on the storage controller layout table 212 illustrated in FIGS. 7 and 8. When receiving the storage controller ID ("SC ID (Active)" illustrated in FIG. 32 as an input from the tie breaker 542, the data center searcher 611 searches for the data center ID of the data center 10 in which the storage controller 131 indicated by the input storage controller ID is disposed using the held storage controller layout table, and outputs the data center ID ("DC ID" illustrated in FIG. 32).

The compute node searcher 612 receives and holds information of a compute node layout table (for example, the compute node layout table 214 illustrated in FIG. 10) from the layout module 541. When receiving the data center ID ("DC ID" illustrated in FIG. 32) as an input from the data center searcher 611, the compute node searcher 612 searches for the compute node IDs of all the compute nodes 110 disposed in the data center 10 indicated by the input data center ID using the compute node layout table, and outputs the compute node IDs as a list ("CN ID" illustrated in FIG. 32).

The storage controller searcher 613 receives and holds information of a controller pair layout table (for example, the controller pair layout table 213 illustrated in FIG. 9) from the layout module 541. When receiving the storage controller ID ("SC ID (Active)" illustrated in FIG. 32 as an input from the tie breaker 542, the storage controller searcher 613 searches for the storage controller ID of the other storage controller 131 in the controller pair 134 paired with the storage controller 131 indicated by the input storage controller ID using the held controller pair layout table and outputs the storage controller ID ("SC ID (Standby)" illustrated in FIG. 32).

Upon receiving one storage controller ID in the active state as an input from the tie breaker 542, the migration proposer 544 having the internal configuration as described above acquires the ID list of the compute nodes 110 belonging to the same data center 10 as the storage controller 131 indicated by the received storage controller ID using the data center searcher 611A and the compute node searcher 612. The list of compute node IDs is a list including the compute nodes 110 to be moved in the arrangement method proposed by the migration proposer 544, and is internally an input to the proposal generator 614.

Further, the migration proposer 544 acquires the ID of the data center 10 to which the other storage controller 131 paired with the storage controller 131 indicated by the storage controller ID belongs using the storage controller searcher 613 and the data center searcher 611B with respect to the storage controller ID in the active state received as an input from the tie breaker 542. The data center ID is an ID of the data center 10 as a migration destination of the compute node 110 in the arrangement method proposed by the migration proposer 544, and is internally an input to the proposal generator 614.

Next, processing in the migration proposer 544 after the list "CD IN" of the compute node IDs and the data center ID "DC ID" are input to the proposal generator 614 as described above will be described.

The proposal generator 614 generates a proposal for moving the compute node 110 on the basis of the input compute node ID list and data center ID, and outputs the proposal to the filter 615. Specifically, for example, when the list of compute node IDs includes "CN002 (compute node ID #2)" and the data center ID is "DC001 (data center ID #1)", a proposal of "moving the compute node #2 to the data center #1" is generated.

The filter 615 determines whether to pass the proposal generated by the proposal generator 614 to the compute manager 560. In the initial state, the filter 615 is in an OFF state (Filter OFF), and the filter 615 in the OFF state passes the proposal to the compute manager 560. On the other hand, in a case where the proposal is once transferred to the compute manager 560, the filter 615 is in the ON state (Filter ON), and the filter 615 in the ON state disapproves all subsequent proposals without transferring them to the compute manager 560 (until the next change to the OFF state).

The reason why the proposal of the proposal generator 614 is rejected by the filter 615 is that there is a possibility that the compute node 110 does not remain at a fixed position if the arrangement change of the compute node 110 is proposed a plurality of times while the control to stop the storage controller 131 is performed. Therefore, by filtering the second and subsequent proposals, the movement of the compute node at the time of communication failure is kept at one time. The ON state of the filter 615 is switched to the OFF state when a predetermined instruction is issued from the storage cluster controller 540. Specifically, the storage cluster controller 540 instructs the filter 615 to be in the OFF state when the storage cluster 520 (storage system 500) recovers from a failure.

As described above, in the computer system 3 according to the third embodiment, similarly to the computer system 1 according to the first embodiment, it is possible to determine the failure control method for stopping all the storage controllers 131 belonging to any one of the storage nodes 130 so as to suppress the communication volume (throughput) between the data centers accompanying the I/O processing to be small when the communication failure occurs between the controller pair, and it is possible to propose the arrangement method of the compute nodes 110 so that not only the storage controllers 131 can be stopped according to the determined failure control method but also the inter-data center communication volume can be further reduced (set to 0). Then, the compute manager 560 can change the arrangement of the compute nodes 110 when accepting the proposal.

(4) Fourth Embodiment

A fourth embodiment is an embodiment obtained by extending the second embodiment, and a function of proposing a method of arranging the compute nodes 110 capable of further reducing the inter-data center communication volume in a state after the volume is stopped by the communication failure control is added. In the following description, a configuration unique to the fourth embodiment will be mainly described based on the configuration according to the second embodiment.

Figure 33:
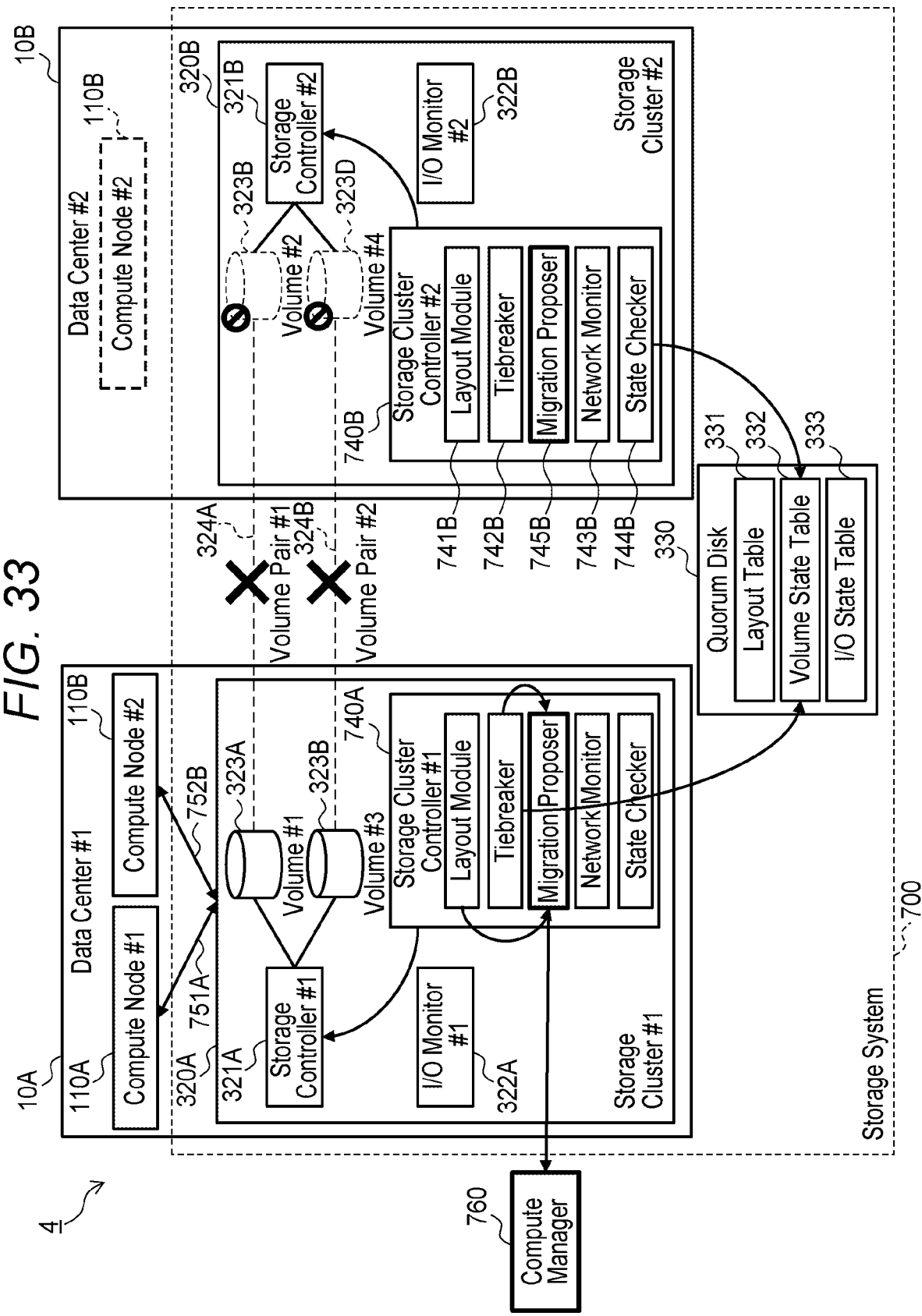
FIG. 33 is a conceptual diagram of a computer system 4 according to a fourth embodiment of the present invention.

FIG. 33 is a conceptual diagram of a computer system 4 according to the fourth embodiment of the present invention. FIG. 33 also illustrates an image of communication failure control in the fourth embodiment.

As illustrated in FIG. 33, a storage system 700 included in the computer system 4 includes a storage cluster controller 740 having an internal configuration different from that of the storage cluster controller 340 as a difference from the configuration of the storage system 300 in the second embodiment illustrated in FIG. 19. In addition, a compute manager 760 is added to the computer system 4 as a difference from the computer system 2 according to the second embodiment.

The storage cluster controller 740 in the fourth embodiment includes a layout module 741, a tie breaker 742, a network monitor 743, a state checker 744, and a migration proposer 745. Among them, the configuration other than the migration proposer 745 is similar to the configuration of the storage cluster controller 340 of the second embodiment having the same name, but differs from the second embodiment in a part of the processing by the tie breaker 742. Details of the storage cluster controller 740 will be described below.

When a communication failure occurs in the volume pair 324, the tie breaker 742 determines a method of stopping the volume 323 similarly to the tie breaker 342 according to the second embodiment, and requests the storage cluster controller 740 to perform control to stop the determined volume 323. At this time, the tie breaker 742 also passes the ID of the volume 323 to be stopped to the migration proposer 745.

Specifically, in the case of FIG. 33, the tie breaker 742A of the storage cluster controller 740A (storage cluster controller #1) determines to stop the volume #2 and the volume #4 disposed in the storage cluster #2, and passes the IDs "V002" and "V004" of the two volumes to the migration proposer 745.

The migration proposer 745 has a function of proposing a method of arranging the compute nodes 110 that can be expected to further reduce the inter-data center communication volume in a state after the predetermined volume 323 is stopped. Upon receiving the volume ID from the tie breaker 742, the migration proposer 745 acquires the configuration information of the storage system 700 and the arrangement information of the compute nodes 110 from the layout module 741. Then, the migration proposer 745 calculates an arrangement method of the compute nodes 110 expected to reduce the inter-data center communication volume in a state after the volume 323 is stopped by the failure control on the basis of the acquired information, and proposes the arrangement method to the compute manager 760.

The compute manager 760 is a mechanism that controls the arrangement and operation of the compute nodes 110. Upon receiving a proposal for a compute node arrangement method from the migration proposer 745, the compute manager 760 determines whether to implement the proposal. The determination may be performed on the basis of a program prepared in advance, or the determination by the user may be received. Then, in a case where it is determined to implement the proposal, the compute manager 760 changes the arrangement of the compute nodes 110 according to the content of the proposal.

Specifically, in the case of FIG. 33, the compute manager 760 controls the compute node #1 (compute node 110A) and the compute node #2 (compute node 110B). In a state before the communication failure occurs and the failure control is performed, the compute node #1 is disposed in the data center 10A, and the compute node #2 is disposed in the data center #2. Thereafter, after the volumes #2 and #4 in the data center #2 are stopped by the failure control, the migration proposer 745 proposes arranging the compute node #2 in the data center #1 as an arrangement method for further reducing the inter-data center communication volume. In response to this proposal, the compute manager 760 moves the compute node #2 disposed in the data center #2 to the data center #1.

As a result of the arrangement control of the compute nodes 110 performed by the compute manager 760 as described above, the compute nodes #1 and #2 are placed in the data center #1. In such a state, in the storage system 700, as illustrated in FIG. 33, the paths of the compute nodes #1 and #2 with respect to the storage system 700 are only the intra-data center paths 751A and 751B in the data center #1, and the inter-data center communication can be made 0.

Figure 34:
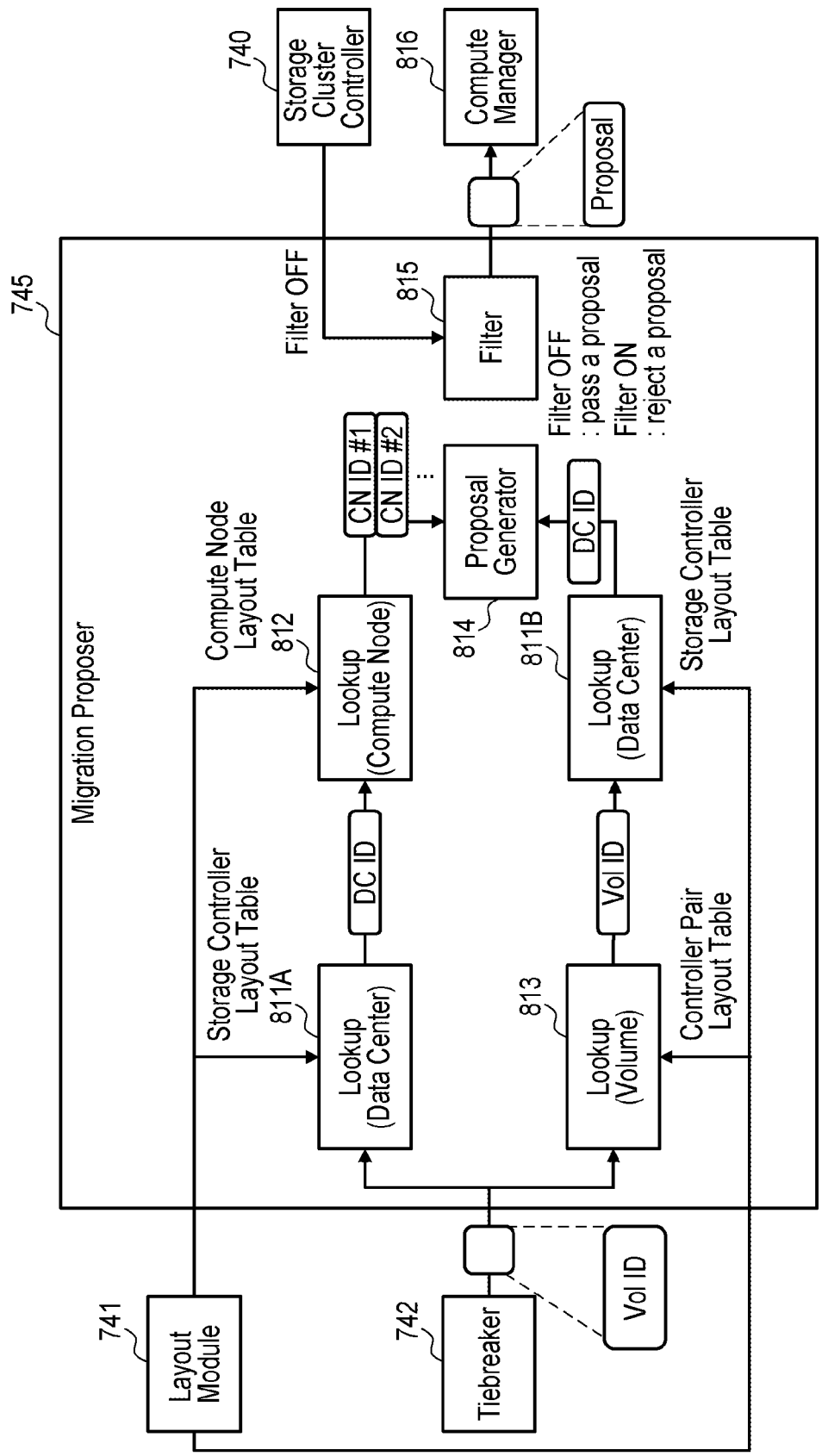
FIG. 34 is a diagram illustrating a configuration example of a migration proposer 745.

FIG. 34 is a diagram illustrating a configuration example of the migration proposer 745. As illustrated in FIG. 34, the migration proposer 745 includes a data center searcher 811 (individually, a data center searcher 811A and a data center searcher 811B), a compute node searcher 812, a volume searcher 813, a proposal generator 814, and a filter 815.

The data center searcher 811 receives and holds volume layout table information from the layout module 741. The internal configuration of the layout module 741 may be considered to be similar to that of the layout module 341 shown in FIG. 22 in the second embodiment, and includes a layout updater 411, a volume layout table 412, a volume pair layout table 413, and a compute node layout table 414 therein. Therefore, the information of the volume layout table received by the data center searcher 811 may be considered as the information of the volume layout table 412 illustrated in FIGS. 22 and 23. When receiving the volume ID ("Vol ID" illustrated in FIG. 34) as an input from the tie breaker 742, the data center searcher 811 searches for the data center ID of the data center 10 in which the volume 323 indicated by the input volume ID is disposed using the held volume layout table and outputs the data center ID ("DC ID" illustrated in FIG. 34).

The compute node searcher 812 receives and holds information of a compute node layout table (for example, the compute node layout table 214 illustrated in FIG. 10) from the layout module 741. When receiving the data center ID ("DC ID" illustrated in FIG. 34) as an input from the data center searcher 811, the compute node searcher 812 searches for the compute node IDs of all the compute nodes 110 disposed in the data center 10 indicated by the input data center ID using the compute node layout table, and outputs the compute node IDs as a list ("CN ID" illustrated in FIG. 34).

The volume searcher 813 receives and holds information of a volume pair layout table (for example, the volume pair layout table 413 illustrated in FIG. 24) from the layout module 741. When receiving the volume ID ("Vol ID" illustrated in FIG. 34) from the tie breaker 742 as an input, the volume searcher 813 searches for the volume ID of the other volume 323 in the volume pair 324 paired with the volume 323 indicated by the input volume ID using the held volume pair layout table, and outputs the searched volume ID ("Vol ID" illustrated in FIG. 34).

Upon receiving one volume ID as an input from the tie breaker 742, the migration proposer 745 having the internal configuration as described above acquires an ID list of the compute nodes 110 belonging to the same data center 10 as the volume 323 indicated by the received volume ID using the data center searcher 811A and the compute node searcher 812. The list of compute node IDs is a list including the compute nodes 110 to be moved in the arrangement method proposed by the migration proposer 745, and is internally an input to the proposal generator 814.

Further, the migration proposer 745 acquires the ID of the data center 10 to which the other volume 323 paired with the volume 323 indicated by the volume ID belongs using the volume searcher 813 and the data center searcher 611B with respect to the volume ID received as an input from the tie breaker 742. The data center ID is an ID of the data center 10 as a migration destination of the compute node 110 in the arrangement method proposed by the migration proposer 544, and is internally an input to the proposal generator 814.

Next, processing in the migration proposer 745 after the list "CD IN" of the compute node IDs and the data center ID "DC ID" are input to the proposal generator 814 as described above will be described.

The proposal generator 814 generates a proposal for moving the compute node 110 on the basis of the input compute node ID list and data center ID, and outputs the proposal to the filter 815. Specifically, for example, when the list of compute node IDs includes "CN002 (compute node ID #2)" and the data center ID is "DC001 (data center ID #1)", a proposal of "moving the compute node #2 to the data center #1" is generated.

The filter 815 determines whether to pass the proposal generated by the proposal generator 814 to the compute manager 760. In the initial state, a filter 885 is in an OFF state (Filter OFF), and the filter 615 in the OFF state passes the proposal to the compute manager 760. On the other hand, in a case where the proposal is once transferred to the compute manager 760, the filter 815 is in the ON state (Filter ON), and the filter 815 in the ON state disapproves all subsequent proposals without transferring them to the compute manager 760 (until the next change to the OFF state).

The reason why the proposal of the proposal generator 814 is rejected by the filter 815 is that there is a possibility that the compute node 110 does not remain at a fixed position if the change in arrangement of the compute node 110 is proposed a plurality of times while the control to stop the volume 323 is performed. Therefore, by filtering the second and subsequent proposals, the movement of the compute node at the time of communication failure is kept at one time. The ON state of the filter 815 is switched to the OFF state when a predetermined instruction is issued from the storage cluster controller 740. Specifically, the storage cluster controller 740 instructs the filter 815 to be in the OFF state when the storage system 700 recovers from a failure.

As described above, in the computer system 4 according to the fourth embodiment, similarly to the computer system 2 according to the second embodiment, it is possible to determine the failure control method for stopping any one of the volume pairs disconnected due to the communication failure so as to suppress the communication volume (throughput) between the data centers accompanying the I/O processing to be small when the communication failure occurs between the volume pairs, and it is possible to propose the arrangement method of the compute nodes 110 so that not only the volume 323 can be stopped according to the determined failure control method but also the inter-data center communication volume can be further reduced (reduced to 0). Then, the compute manager 760 can change the arrangement of the compute nodes 110 when accepting the proposal.

Although various embodiments and modifications of the computer system according to the present invention have been described above, these are examples for describing the present invention, and it is not intended to limit the scope of the present invention only to these embodiments. The present invention may be appropriately combined with each embodiment, or can be carried out in other various forms. As described in these embodiments and the like, the computer system according to the present invention includes: an I/O monitor that collects and records communication characteristics related to I/O with an application (compute node) for a storage controller or a volume in each storage node (or storage cluster) disposed in a plurality of data centers; and a mechanism (tie breaker) that determines failure control when a communication failure occurs. Then, when the storage system recognizes a communication failure in the communication path between the pair, the failure control determination mechanism aggregates statistical information of the communication characteristics from the I/O monitor, and determines failure control to stop the storage controller or the volume so that the inter-data center communication volume is minimized. With such a configuration, when a communication failure occurs in a storage system (for example, a storage system operating in a cloud environment) in which a plurality of computers are coupled via a network across a plurality of data centers, the storage system performs failure control according to the determination by the mechanism so that an inter-data center communication volume is minimized, so that it is possible to suppress occurrence (or increase) of billing associated with I/O processing and suppress (most preferably, minimize) an increase in response in the I/O processing.

What is claimed is:

1. A computer system that is configured by a plurality of computers disposed in a plurality of data centers in a network, the system comprising:

a compute node that executes an application;
a storage node that includes a storage controller that processes I/O from the compute node and performs inputting/outputting to/from a storage device; and
a storage cluster controller that controls the storage node, wherein
storage controllers disposed in different data centers form a pair, and another storage controller communicates via a communication path between the data centers to take over processing of one storage controller of the pair,
an I/O monitor is provided which collects communication characteristics between the application and the storage controller, performs predetermined statistical processing to determine intra-data center communication volume and inter-data center communication volume for each storage controller, and generates statistical information,
when a communication failure occurs in a communication path between the storage controllers forming the pair, a tie breaker included in the storage cluster controller decides failure control of taking over data input/output from one of the storage controllers forming the pair to another storage controller and stopping a storage node including the one storage controller based on comparing calculated inter-data center communication volumes that would result from stopping each storage controller, wherein the tie breaker calculates the inter-data center communication volumes by combining intra-data center communication volume of a first storage controller with inter-data center communication volume of a second storage controller when stopping the first storage controller, and combining intra-data center communication volume of the second storage controller with inter-data center communication volume of the first storage controller when stopping the second storage controller, and selects which storage controller to stop based on which calculated inter-data center communication volume is smaller,
the storage cluster controller executes failure control determined by the tie breaker, and
an application that has performed I/O to the storage controller of the stopped storage node sends I/O to the storage controller that has taken over the processing.

2. The computer system according to claim 1, wherein
the compute node and the storage node are connected to other data centers via different communication paths,
an application of the compute node is capable of sending an I/O request to a storage controller of a storage node of another data center,
a plurality of applications and a plurality of pairs of storage controllers are provided,
an application and a storage controller that processes an I/O of the application are disposed in each data center such that a communication volume between the data centers is reduced, and
the tie breaker determines the storage node to be stopped such that an increase in a communication volume between the data centers is reduced when a storage node is stopped.

3. The computer system according to claim 2, wherein
when storage controllers disposed in the different data centers form a controller pair via a communication path between the data centers, two storage controllers forming the controller pair are configured such that one storage controller manages a volume in an active state and another storage controller stands by in a standby state, and when a first storage controller in an active state is stopped by execution of the failure control, a second storage controller in a standby state forming a controller pair with the first storage controller becomes an active state and takes over management of a volume by the first storage controller.

4. The computer system according to claim 3, wherein
when the controller pair is configured by storage controllers included in storage nodes disposed in the different data centers, and a communication failure occurs in a communication path between data centers in the controller pair, the tie breaker stops all the storage controllers in the storage node including any one of the storage controllers forming the controller pair, and determines the failure control so as to minimize a communication volume between data centers after the stop.

5. The computer system according to claim 3, wherein
when a communication failure occurs in a communication path between data centers in two or more sets of storage nodes in which the controller pair is configured by storage controllers included in storage nodes disposed in the different data centers, the tie breaker independently determines the failure control for each set of storage nodes in which the controller pair is formed.

6. The computer system according to claim 2, wherein
the storage controller provides a volume to the application to perform I/O,
when volumes disposed in the different data centers form a volume pair via a communication path between data centers, two volumes forming the volume pair are configured to operate together in an active state to synchronize data, and
when one first volume forming the volume pair is stopped by execution of the failure control, a second volume forming a volume pair with the first volume continues to accept I/O.

7. The computer system according to claim 6, wherein
when the volume pair is configured by volumes included in storage nodes disposed in the different data centers and a communication failure occurs in a communication path between data centers in two or more sets of the volume pairs, the tie breaker independently determines the failure control for each of the volume pairs.

8. The computer system according to claim 1, wherein
when the storage controller or a volume managed by the storage controller is stopped due to execution of the failure control, the storage cluster controller further includes a migration proposer that proposes a change in arrangement of the applications in the plurality of data centers so as to minimize a communication volume in a communication path between the data centers after the change based on configuration information of a storage system and arrangement information of the applications.

9. The computer system according to claim 8, wherein
the migration proposer outputs a proposal for a change in arrangement of the applications to a mechanism that controls arrangement and operation of the applications.

10. A storage control method executed by a computer system that is configured by a plurality of computers disposed in a plurality of data centers in a network, wherein
the computer system includes:
a compute node that executes an application;
a storage node that includes a storage controller that processes I/O from the compute node and performs inputting/outputting to/from a storage device; and a storage cluster controller that controls the storage node, storage controllers disposed in different data centers form a pair, and another storage controller communicates via a communication path between the data centers to take over processing of one storage controller of the pair, an I/O monitor is provided which collects communication characteristics between the application and the storage controller, performs predetermined statistical processing to determine intra-data center communication volume and inter-data center communication volume for each storage controller, and generates statistical information, when a communication failure occurs in a communication path between the storage controllers forming the pair, a tie breaker included in the storage cluster controller decides failure control of taking over data input/output from one of the storage controllers forming the pair to another storage controller and stopping a storage node including the one storage controller based on comparing calculated inter-data center communication volumes that would result from stopping each storage controller, wherein the tie breaker calculates the inter-data center communication volumes by combining intra-data center communication volume of a first storage controller with inter-data center communication volume of a second storage controller when stopping the first storage controller, and combining intra-data center communication volume of the second storage controller with inter-data center communication volume of the first storage controller when stopping the second storage controller, and selects which storage controller to stop based on which calculated inter-data center communication volume is smaller, the storage cluster controller executes failure control determined by the tie breaker, and an application that has performed I/O to the storage controller of the stopped storage node sends I/O to the storage controller that has taken over the processing.

* * * * *